Jan. 11, 1927. 1,613,748
J. E. FEFEL
MACHINE FOR PRODUCING LINED POUCHES
Filed Nov. 15, 1924 12 Sheets-Sheet 1

INVENTOR.
John Edward Fefel
BY
Chamberlain & Newman ATTORNEYS.

Jan. 11, 1927. 1,613,748
J. E. FEFEL
MACHINE FOR PRODUCING LINED POUCHES
Filed Nov. 15, 1924 12 Sheets-Sheet 4

INVENTOR
John Edward Fefel
BY
Chamberlain & Newman ATTORNEYS.

Jan. 11, 1927. 1,613,748
J. E. FEFEL
MACHINE FOR PRODUCING LINED POUCHES
Filed Nov. 15, 1924 12 Sheets-Sheet 5

INVENTOR.
John Edward Fefel
BY
Chamberlain & Newman ATTORNEYS.

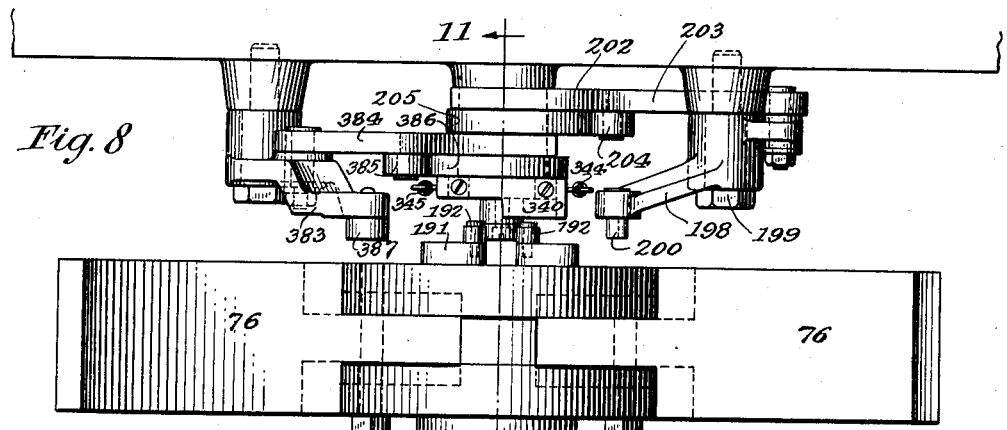
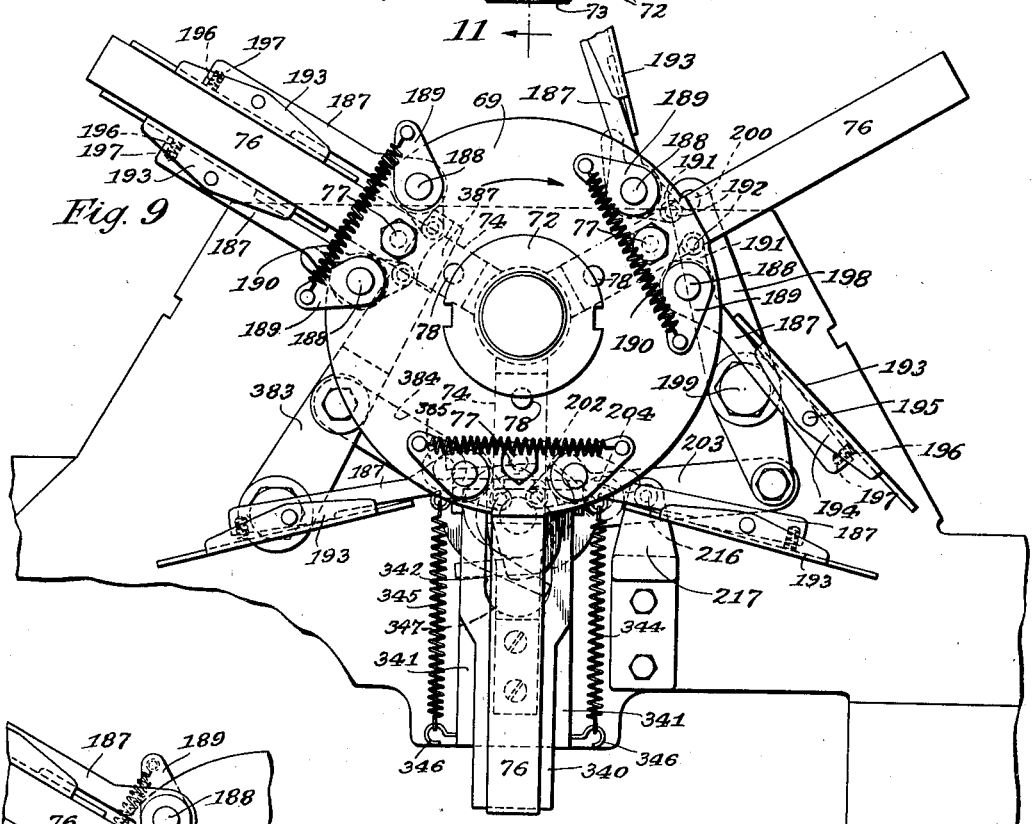
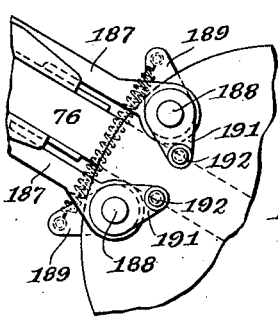

Jan. 11, 1927.
J. E. FEFEL
1,613,748
MACHINE FOR PRODUCING LINED POUCHES
Filed Nov. 15, 1924    12 Sheets-Sheet 7
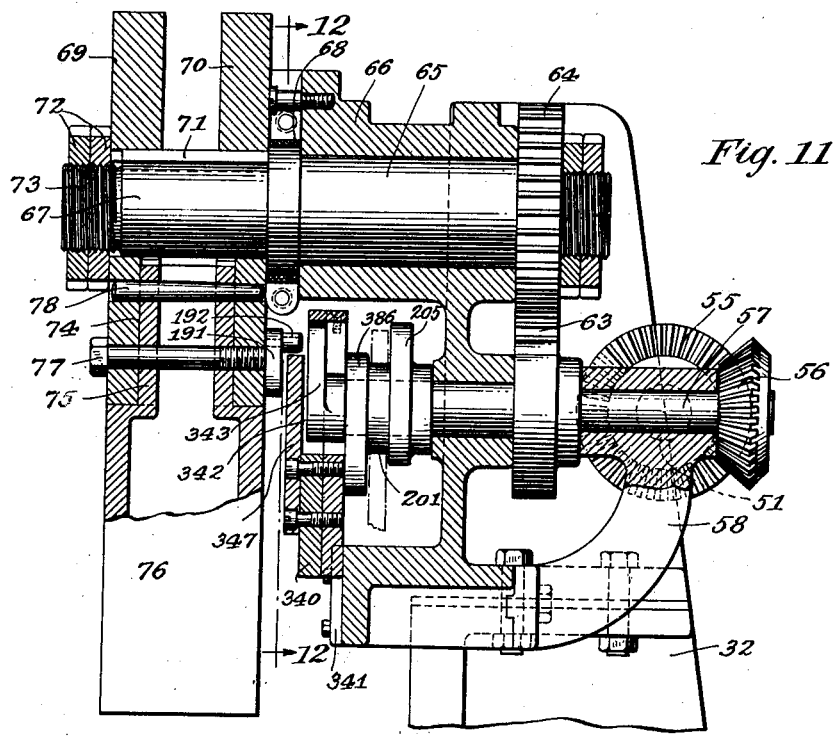
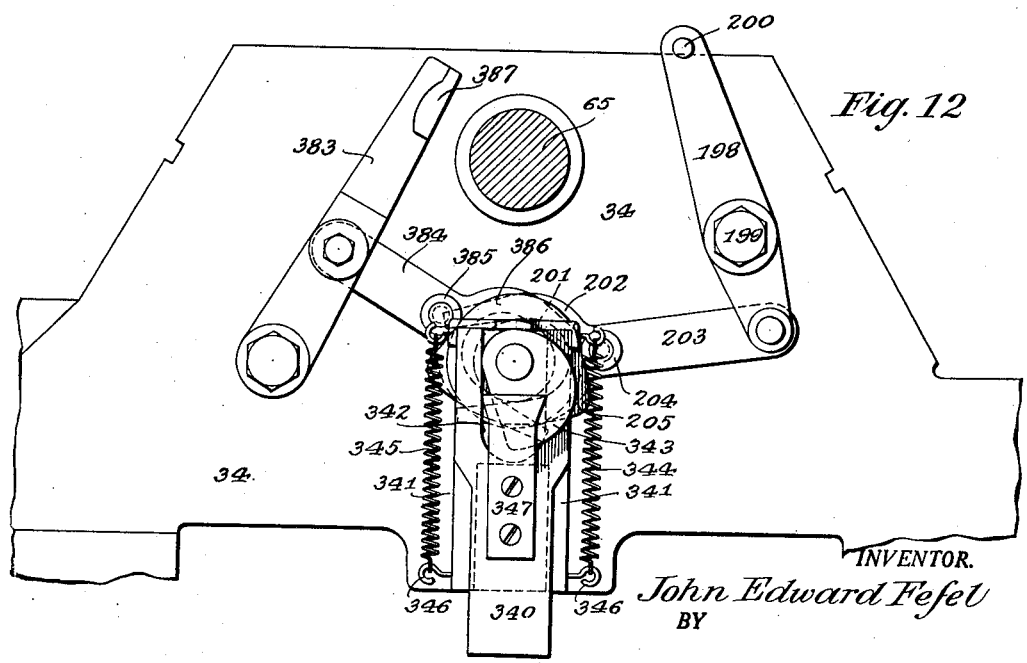
INVENTOR.
John Edward Fefel
BY
Chamberlain + Newman
ATTORNEYS.

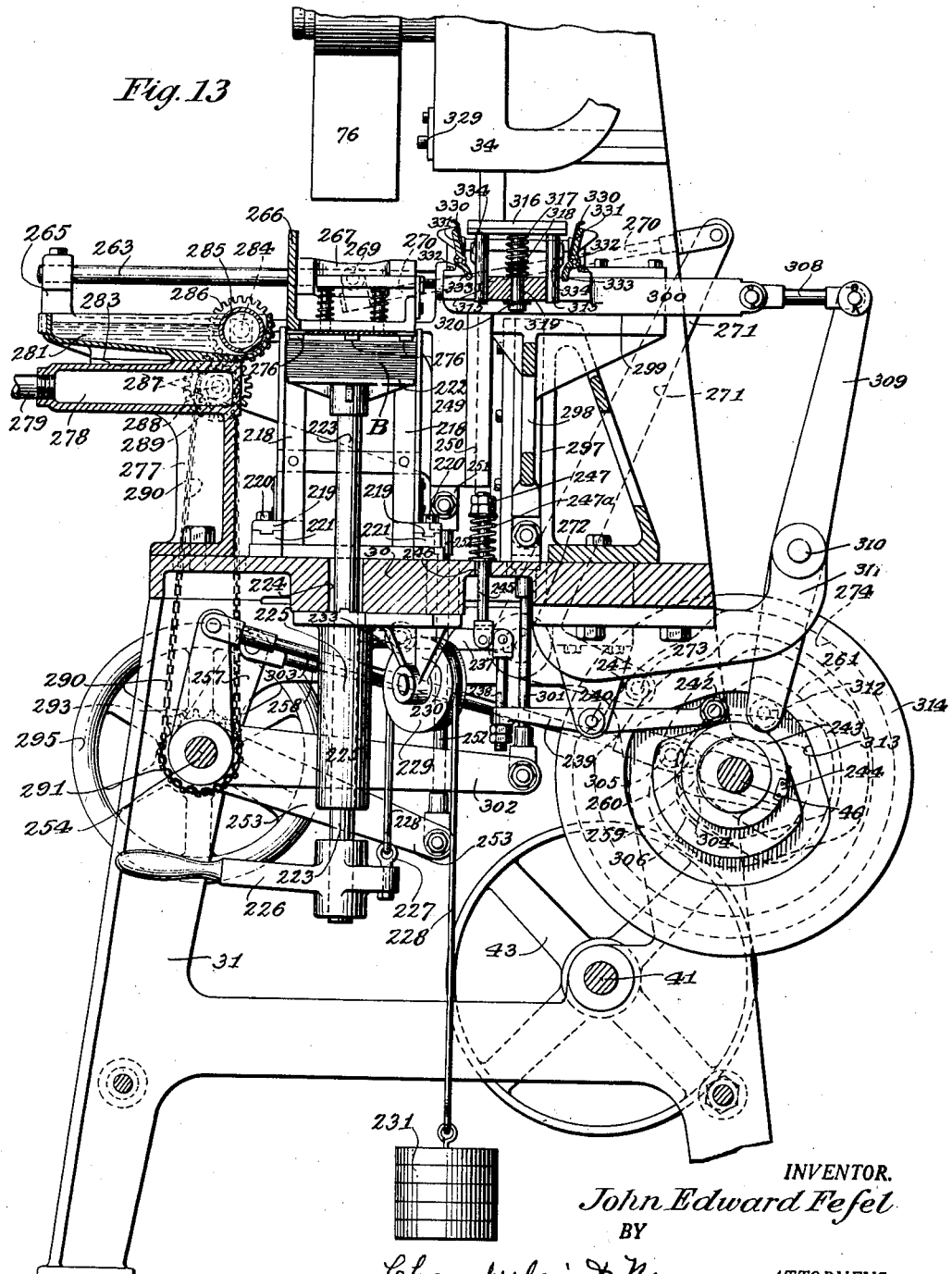

Jan. 11, 1927.　　　　　　　　　　　　　　　　　　　　　1,613,748
J. E. FEFEL
MACHINE FOR PRODUCING LINED POUCHES
Filed Nov. 15, 1924　　　12 Sheets-Sheet 9

INVENTOR.
John Edward Fefel
BY
Chamberlain & Newman ATTORNEYS.

Jan. 11, 1927.  1,613,748
J. E. FEFEL
MACHINE FOR PRODUCING LINED POUCHES
Filed Nov. 15, 1924  12 Sheets-Sheet 10
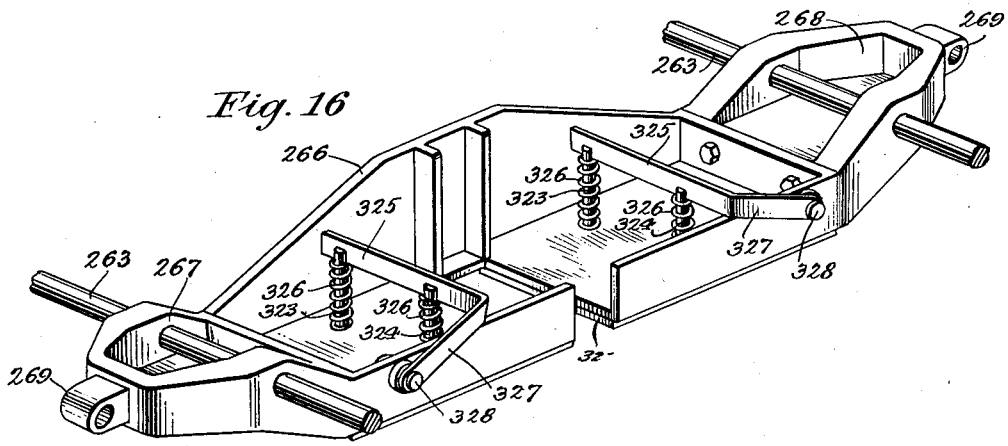
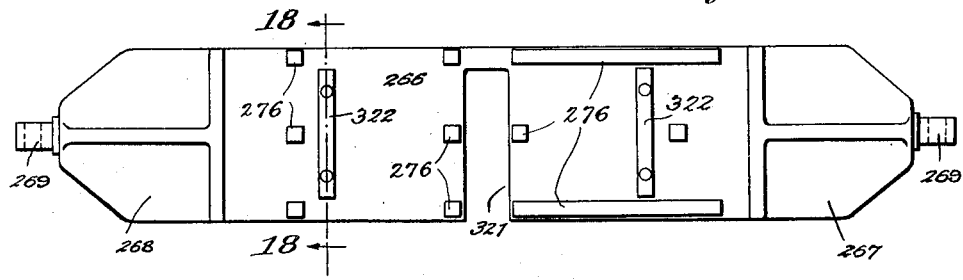
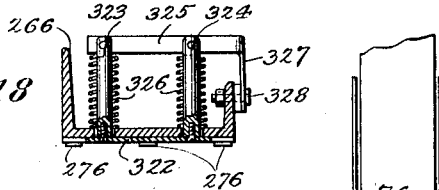
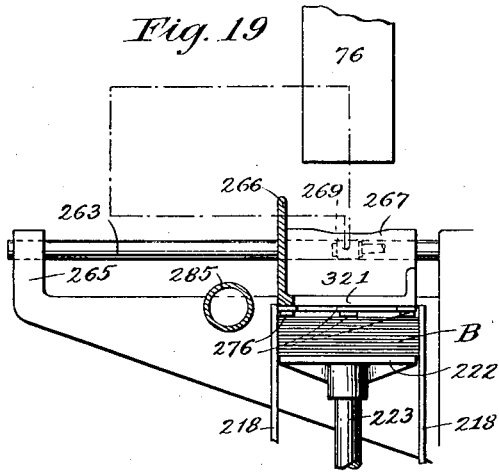
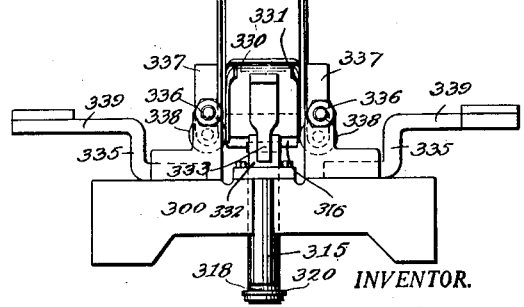
INVENTOR.
John Edward Fefel
BY
Chamberlain & Newman ATTORNEYS.

Jan. 11, 1927.
J. E. FEFEL
1,613,748
MACHINE FOR PRODUCING LINED POUCHES
Filed Nov. 15, 1924     12 Sheets-Sheet 11
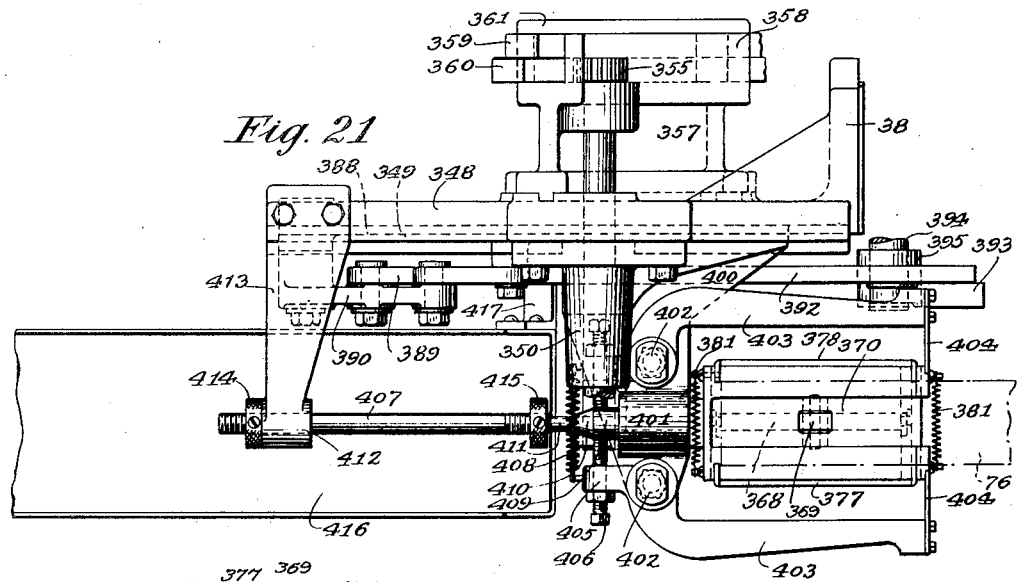
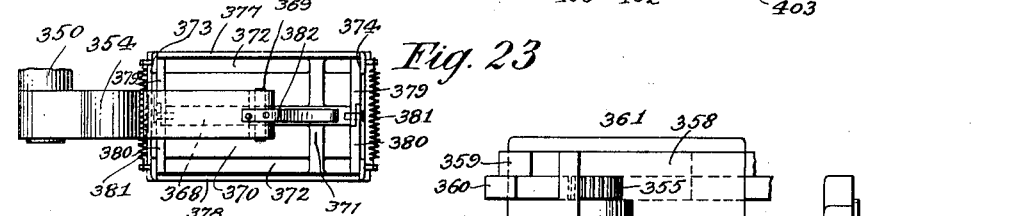
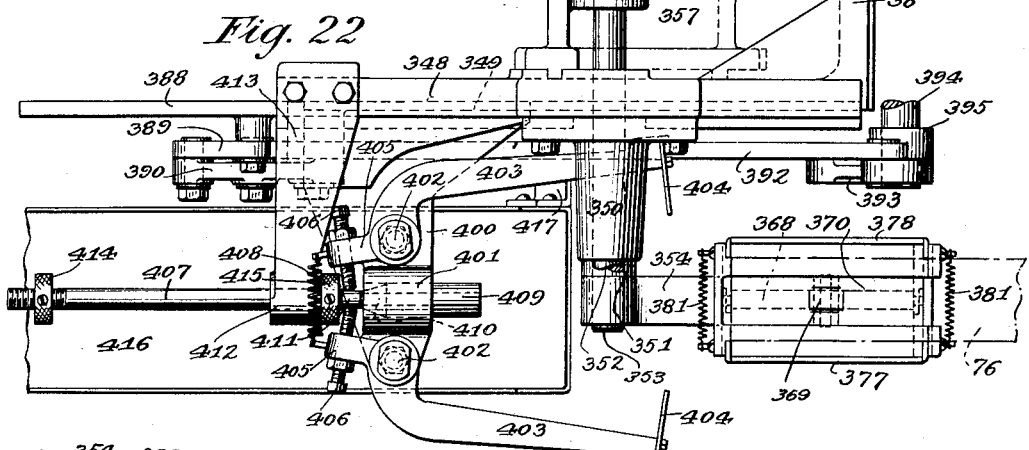
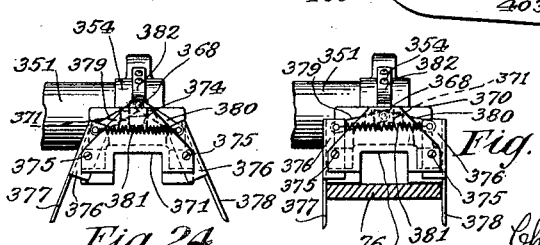
INVENTOR.
John Edward Fefel
BY
Chamberlain + Newman ATTORNEYS.

Jan. 11, 1927. 1,613,748
J. E. FEFEL
MACHINE FOR PRODUCING LINED POUCHES
Filed Nov. 15, 1924 12 Sheets-Sheet 12
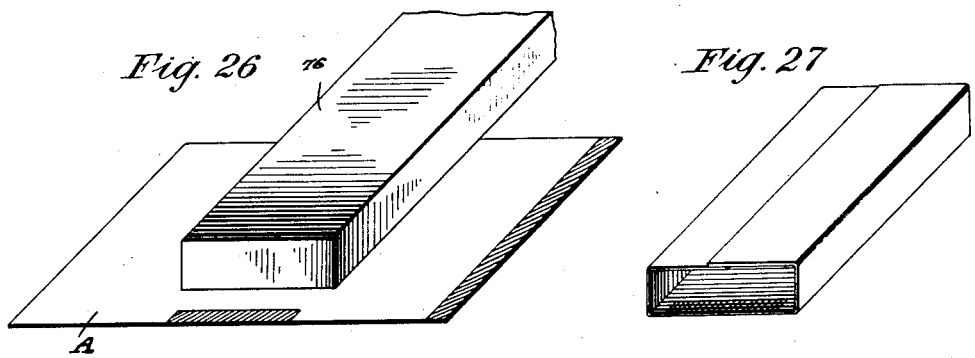
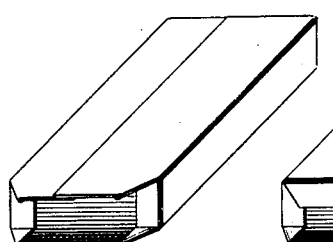 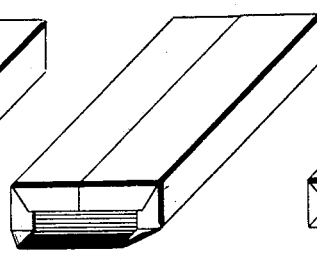 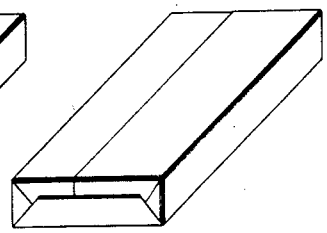
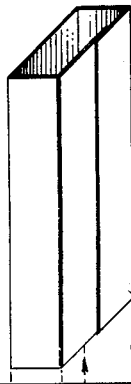  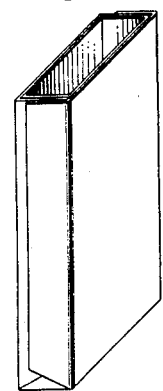
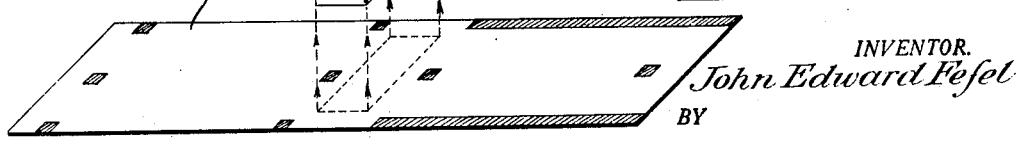
INVENTOR.
John Edward Fefel
BY
Chamberlain + Newman ATTORNEYS.

Patented Jan. 11, 1927.

1,613,748

UNITED STATES PATENT OFFICE.

JOHN EDWARD FEFEL, OF BRIDGEPORT, CONNECTICUT, ASSIGNOR TO THE LUDINGTON MACHINE CO., INC., OF WATERBURY, CONNECTICUT, A CORPORATION OF CONNECTICUT.

MACHINE FOR PRODUCING LINED POUCHES.

Application filed November 15, 1924. Serial No. 750,190.

This invention relates to a machine for producing lined pouches such as are used for containing tobacco or the like, the lining being in the nature of a water-proof protective element, an object of the invention being to provide a machine of this character into which paper having characteristics making it suitable for lining purposes is fed, and folded and pasted or glued, to produce a pouch form; and also into which paper having wrapper characteristics is fed, folded and pasted or glued into pouch form about the lining; and to further provide a machine in which these operations are carried on continuously, automatically and in an efficient manner.

The machine is such therefore, that the pouch material, i. e., the lining and wrapper or label paper, is placed in the machine in suitable quantities—the former, in the present embodiment, being in the form of a continuously rolled strip, while the latter are cut into individual lengths and suitably printed and stacked in the machine—and the finished pouches are automatically delivered therefrom.

In particular it is proposed to provide a machine of this character in which a form carrier is intermittently rotated between a series of work stations, at which feeding and forming mechanisms are respectively operated to successively produce the lining and wrapper portions of the pouch, the carrier functioning to support the forms or mandrels about which the pouches are formed and to carry the same from one station to the next, while the feeding and forming mechanisms are substantially fixed.

A further object is to provide a machine which is compact, the movement of the pouches being in a circular path about a fixed axis, as distinguished from those types of machines in which the feeding and forming operations are affected by longitudinal movement, and to provide co-operating driving means for the various mechanisms, driven from a single source, and whereby the several operations are accurately and positively timed and co-related.

A still further object of the invention is to provide a machine of this character which will operate continuously and automatically without necessitating the constant attention of an operative.

A further object is to provide a machine of this character adapted to produce a waterproof lined pouch of reliable construction, in which the sealed folds are so placed as to provide a substantially hermetically sealed container and in which the folds of the lining and the wrapper are not super-imposed. The pouch as produced by the present embodiment of the invention has a lining in which the folds are at the bottom and along the center of one vertical face, while the folds of the wrapper are along the vertical sides.

With the above and other objects in view, an embodiment of the invention is shown in the accompanying drawings, and this embodiment will be hereinafter more fully described with reference thereto, and the invention will be finally pointed out in the claims.

In the drawings:

Fig. 8 is an enlarged top plan view of the rotatable head or carrier carrying the several forms or mandrels, and including the operating mechanism therefor;

Fig. 9 is a front elevation of the same;

Fig. 10 is a rear elevation of a portion of the head, and showing the spring actuated toggle means for operating the holding devices carried thereby;

Fig. 11 is a central vertical sectional view, taken along the line 11—11 of Fig. 8;

Fig. 12 is a sectional elevation, taken along the line 12—12 of Fig. 11, and showing the front portion of a part of the frame of the machine, and mechanism mounted thereon adjacent to and in rear of the form carrier;

Fig. 13 is an enlarged vertical sectional view through the central portion of the lower part of the machine, showing the mechanism for supporting the wrapper or label sheets for forming the pouch, and also showing the feeding, paste applying, and folding mechanism employed in connection therewith;

Fig. 16 is a perspective view of the wrapper feeding and paste-applying head or carrier;

Fig. 17 is a bottom plan view of the same;

Fig. 18 is a sectional view, taken along the line 18—18 of Fig. 17;

Fig. 19 is a diagrammatic view, showing the path of movement of the wrapper feeding and paste-applying head;

Fig. 20 is a view of the folding mechanism, as shown in Fig. 16, but in its operative position;

Fig. 21 is an enlarged top plan view, with certain parts broken away, of the upper left hand portion of the machine, showing the mechanism for completing the folding of the wrapper, and stripping the completed pouch from the form or mandrel, the stripping means being shown in position to remove the pouch;

Fig. 22 is a similar view, and showing the inoperative positon of the stripping means after removal of the pouch;

Fig. 23 is a top plan detail view of the folding device for completing the folding of the wrapper;

Fig. 24 is an end view of the same, and showing it in its open or inoperative position;

Fig. 25 is a similar view, and showing the same in its closed or operative position;

Figs. 26 to 30 are perspective views, showing the pouch lining paper elements in its several stages of being folded into pouch form; and Figs. 31 to 33 are perspective views, showing the wrapper or label sheet element in its several stages of being folded into pouch form about the formed pouch lining, Fig. 33 showing the completed lined pouch.

Similar reference characters indicate corresponding parts throughout the several figures of the drawings.

Figure 1:
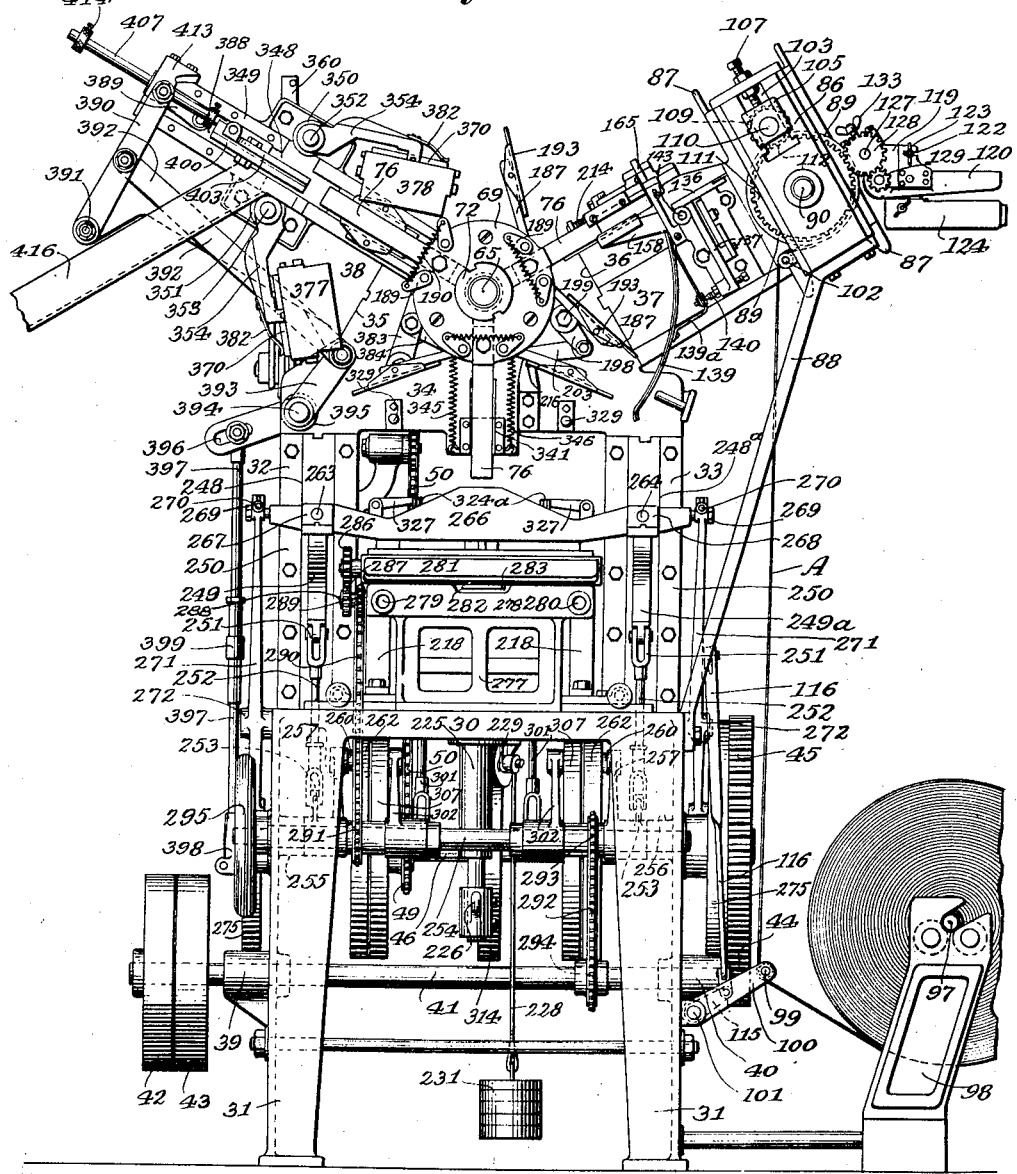
Fig. 1 is a front elevation of the machine, according to the present embodiment of the invention.
Figure 2:
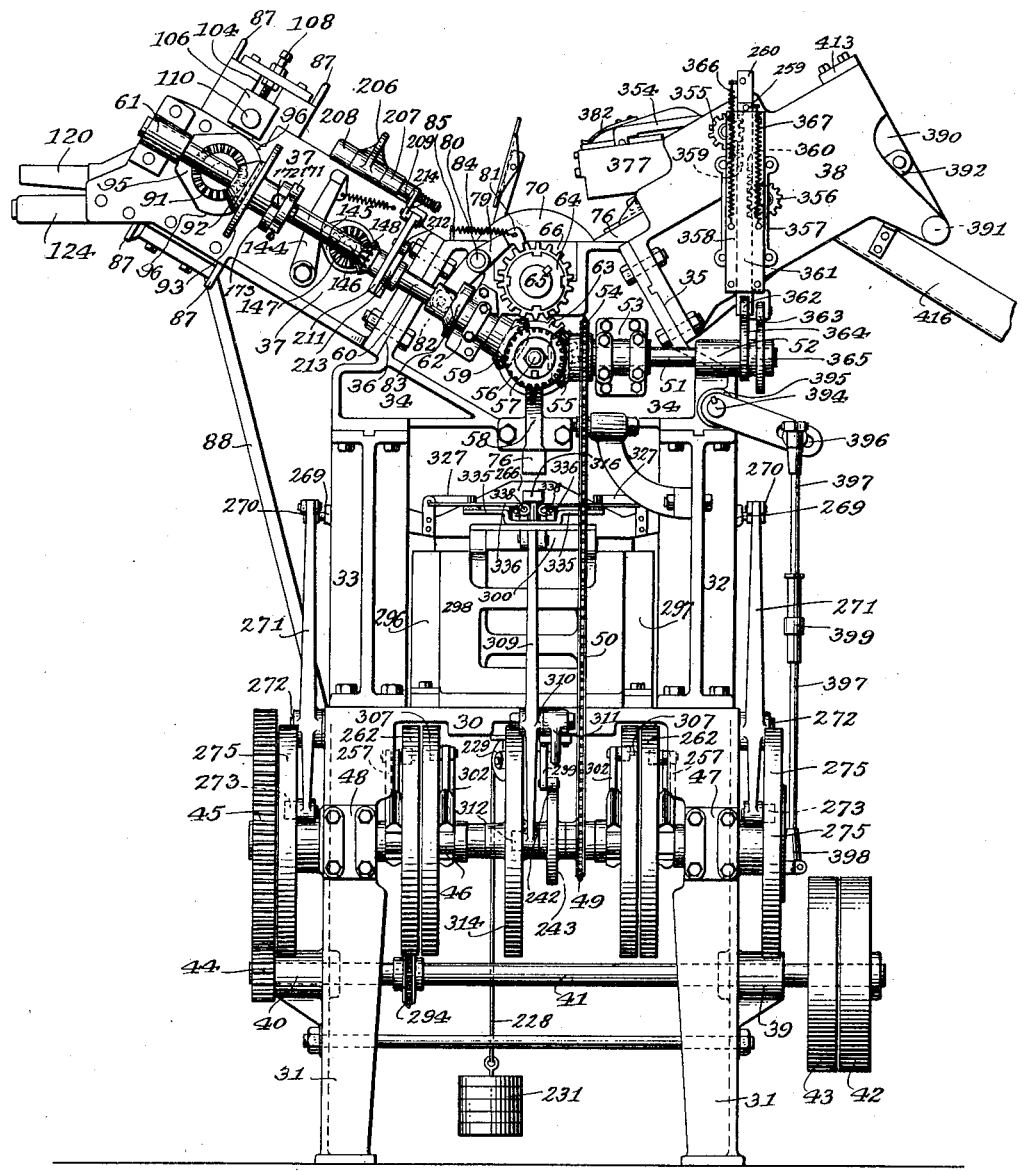
Fig. 2 is a rear elevation of the same.

The machine, according to the present embodiment of the invention, is mounted upon a table-like base consisting of a rectangular top 30 having angular shaped legs 31 at its four corners and to the upper side of which are bolted vertical supports or standards 32 and 33, upon the upper ends of which is supported a super-structure 34, provided on each side with inclined seats 35 and 36 upon which are bolted angularly disposed supporting frames 37 and 38. The frame 37 is adapted to support the lining paper feeding and the forming mechanism, while the frame 38 is adapted to support the folded mechanism for imparting the final folds to the completed pouch, and the stripping mechanism for removing the pouch from the forms of the carrier, the carrier being rotatably mounted upon the super-structure 34 as will herinafter more fully appear. Intermediate the frames 37 and 38 and mounted upon the base 30 there is provided a mechanism for feeding and forming the wrapper; so that three equally spaced stations are provided between which the radially disposed forms of the carrier are successively moved.

In suitable bearings 39 and 40 of the base there is journaled a main drive shaft 41 provided at one end with tight and loose pulleys 42 and 43 adapted for engagement by a driving belt (not shown), and provided at its other end with a pinion 44 which meshes with a large gear 45 upon the end of a cam-carrying counter shaft 46 journaled in suitable bearings 47 and 48 of the base. A sprocket gear 49 is secured upon the shaft 46 intermediate its ends, which drives through an endless sprocket chain 50 a shaft 51 journaled in bearings 52 and 53 of the super-structure 34, said shaft having a sprocket gear 54 secured thereon and over which said sprocket chain 50 is engaged.

A beveled pinion 55 is provided upon the inner end of the shaft 51 which meshes with and drives a beveled pinion 56 carried upon a stud shaft 57 journaled in a bearing bracket 58 secured to the super-structure 34, and which in turn meshes with a beveled pinion 59 provided upon the end of an inclined drive shaft 60, journaled in bearings 61 and 62 secured upon the frame 37 and super-structure 34 respectively, and extending along an inclined axis longitudinally of the inclined frame 37.

The stud shaft 57 carries a segmental spur gear 63 adapted to intermittently mesh and partially rotate a spur gear 64 upon the end of the form carrier shaft 65 rotatably mounted in a bearing portion 66 of the super-structure. The forward end of the shaft 65 is reduced as at 67 and carried through a packing gland 68 secured about the forward end of the reduced portion 67 of the shaft and upon which reduced portion the form carrier is assembled and secured. The carrier comprises a pair of discs 69 and 70 splined to the shaft by means of a key 71, and secured thereon by lock-nuts 72 engaged upon the threaded end 73 of the shaft. At three equally spaced points the plates are provided interiorly with radial grooves 74 in which are engaged the shanks 75 of the forms 76, the shanks being clamped and secured between the discs within said grooves by means of clamping bolts 77 and tapered pins 78. These radially disposed forms are of rectangular form, and of such dimensions as to constitute forms about which the pouches are folded—in other words, the exterior dimensions of the forms correspond to the desired capacity of the pouches—and as is clear from Fig. 11, they are of a hollow construction to obtain lightness.

The shaft 51 and the stud shaft 57 are continuously rotated throughout the operation of the machine, and the continuously rotated segmental gear 63 carried by the stud shaft is so dimensioned that it rotates the form carrier shaft 65 through 120° during each complete revolution of the shaft 51 whereby the forms 76 are intermittently moved from one station to the next.

In order to lock the positions of the form carrier, a locking lever 79 is pivoted upon the super-structure 34 at 80, and is provided at one end with a tooth 81 adapted to be engaged with the teeth of the gear 64 to lock it, and disengaged therefrom to release it, and provided at its other end with a roller 82 riding upon a cam 83 carried upon the shaft 60, the lever being yieldably engaged at its rollered end with said cam by means of a spring 84 tied between the upper end of said lever and an anchor pin 85 secured to the super-structure. It is understood that the cam is so designed that the locking lever is disengaged from the gear 64 during its periods of rotation and is engaged therewith during its stationary periods.

The inclined frame 37 is provided at its outer end with a transversely disposed supporting structure including a vertically disposed wall 86 spaced from the frame and integrally formed horizontally disposed angular beams 87 extending between the upper and lower ends of the frame 37 and the four corners of the wall 86, the outer end of the transverse supporting structure being supported by a strut 88 secured at its lower end to the base 30 and at its upper end to the underside of said structure.

Within the transverse supporting structure there is provided a paper feed drum 89 having its shaft 90 journaled at one end in the vertical wall 86 and at its other end in the frame 37, and upon the end of said shaft there is provided a beveled gear 91 adapted to be intermittently engaged and partially rotated by means of a segmental gear 92 secured upon the shaft 60, the relation of the gear 92 to the gear 91 being such that during a complete revolution of the shaft 60 the gear 91 and the said drum 89 are rotated one-third of a revolution to feed a length of the lining-forming paper, as will presently more fully appear.

Figure 6:
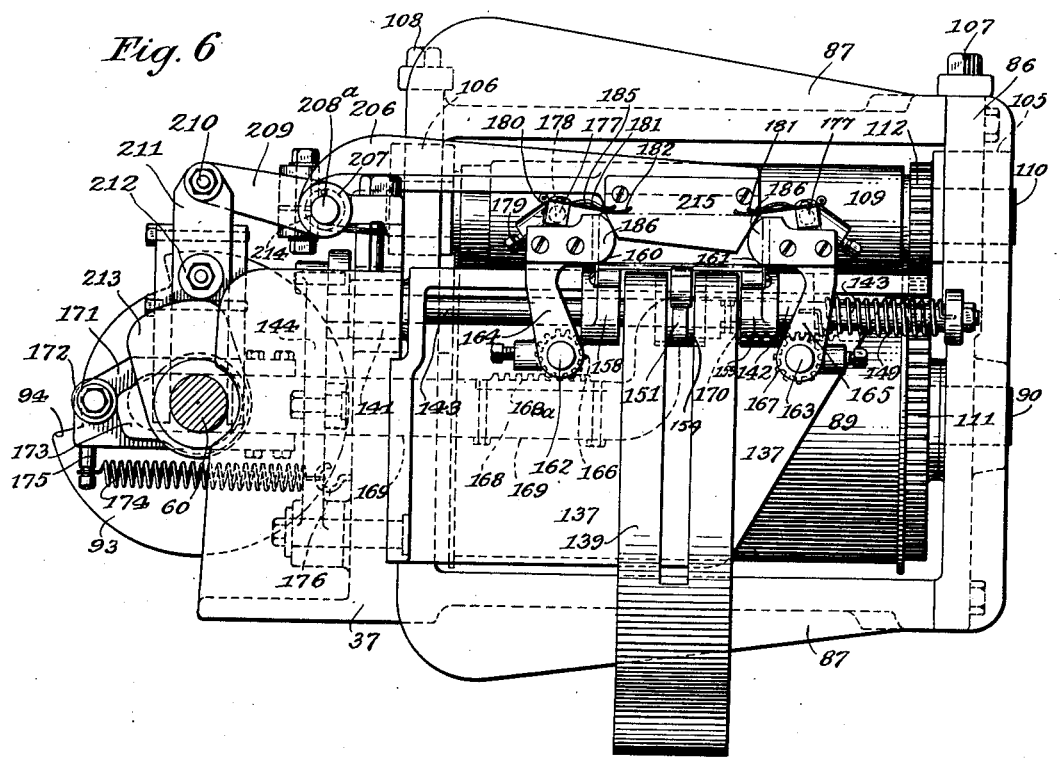
Fig. 6 is an enlarged sectional elevation, taken along the line 6—6 of Fig. 4.

Between these feeding periods the position of the drum is adapted to be fixed, and for this purpose the shaft 60 is provided with a disc 93 having a segmental cut-out portion 94, (Figs. 4 and 6) in radially aligned relation with the teeth of the gear 92 and which co-operates with a plate 95 carried by the shaft 90 of the drum. The disc 93 and plate 95, together with the gears 91 and 92, co-operate in the nature of a Geneva stop movement, the plate 95 having three flat sides, and truncated apices 96, which faces engage the flat marginal face of the disc 93 in successive relation during the stationary periods to fix the positions of the drum, the apices 96 moving through the cut-out 94 of the disc during the meshing or rotational periods of the gear 91 with the gear 92.

The paper A for forming the pouch lining, is in the form of a continuous rolled strip, the paper roll having its spool ends 97 supported in a suitable rack 98, the strip of paper being first carried under a tensioning roller 99 mounted upon an arm 100 secured upon a shaft 101 pivotally supported upon the base, and then carried over a roller 102 mounted upon the frame 37, and from which latter roller it is carried about the said drum 89.

The vertical wall 86 and the opposed vertical wall of the frame 37 are provided with vertical slots 103 and 104 in which bearing blocks 105 and 106 are mounted for vertical adjustment by means of pressure screws 107 and 108, a feed and cutting roll 109 being mounted between said blocks and having its shaft 110 journaled therein and adapted to be driven from the shaft 90 of the drum 89 by means of a large gear 111 provided upon said shaft 90 adjacent the inner side of the wall 86, and a pinion 112 meshing therewith and secured upon the shaft 110.

The roll 109 bears upon the drum 89 and may be engaged with greater or less force as desired by tightening or loosening the pressure screws 107 and 108, the paper A being carried between the drum and the roll and thereby fed into the machine. The roller 109 has a cutting blade 113 set longitudinally therein and slightly projected and adapted as each feeding revolution of the roll is completed to sever a length of the paper adapted for forming the pouch lining. For the purpose of facilitating the feed of the paper, as will hereinafter more fully appear, the severance of the length of paper is not entirely complete, and for this purpose the cutting blade is provided at a plurality of spaced points, preferably two, with non-cutting or partial cutting portions 114 (Fig. 4) which allow small portions of the paper to remain connected at these points.

Figure 3:
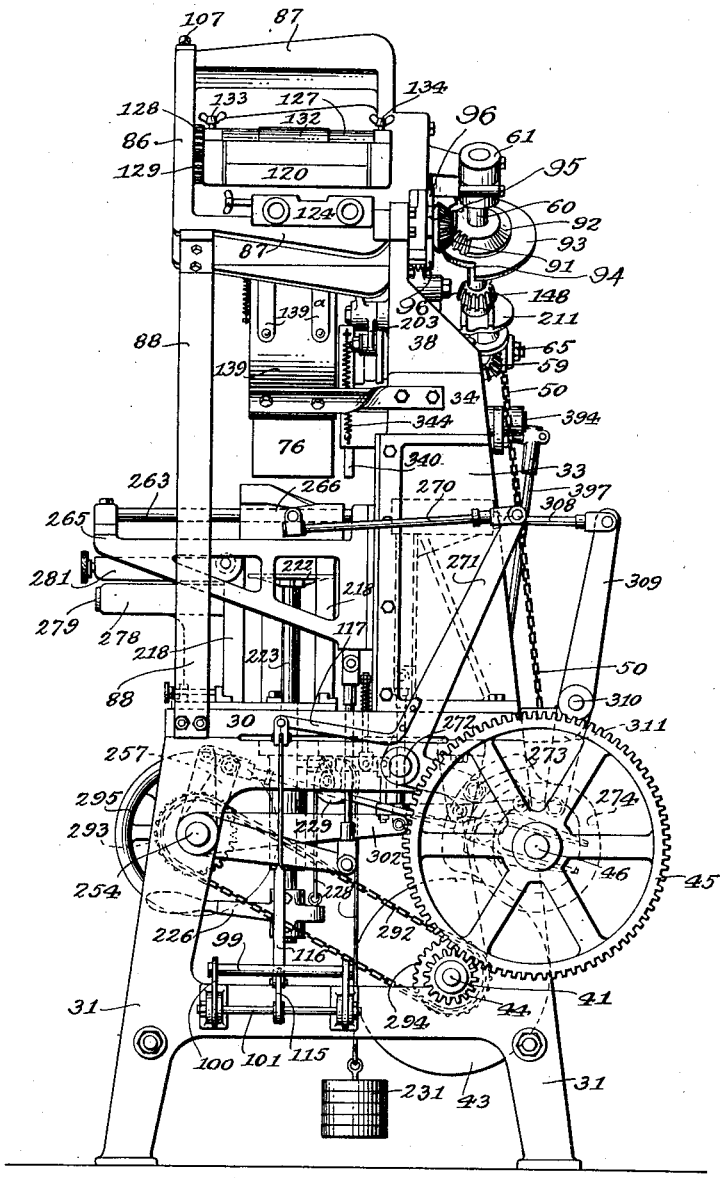
Fig. 3 is a side elevation, as seen from the right, Fig. 1.

In order to assist in the feed of the paper A the arm 100 carrying the roller 99 is intermittently oscillated and for this purpose the shaft 101 is provided with a short arm 115 connected by a link 116 to an arm 117, which latter is secured to an oscillating part of the machine, hereinafter more fully described, and as clearly indicated in Fig. 3. In this manner the lever 100 is intermittently oscillated and imparts a pulling impulse to the paper from the roll, thereby relieving the feed by the drum 89 and the roll 109 from the weight of the paper roll.

Figure 5:
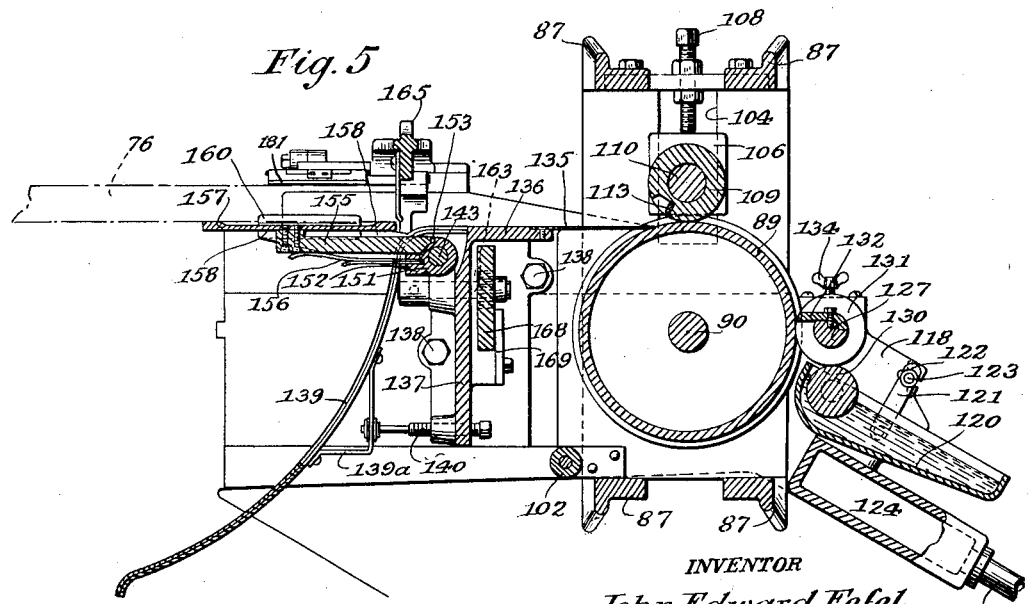
Fig. 5 is a sectional elevation, taken along the line 5—5 of Fig. 4.

As the paper is fed about the drum 89 and prior to its severance, it is adapted to be gummed along one longitudinal edge and along a portion of its transverse edge as indicated in Fig. 26. The pasting mechanism for this purpose is mounted upon suitable bracket extensions 118 and 119 of the frame 37 and the vertical wall 86, and consists of a paste reservoir 120 removably secured between said brackets by means of hangers 121 (Fig. 5), said hangers being secured in the brackets in open-ended slots 122 by means of winged-nuts 123 for removal of the reservoir for cleaning purposes when desired. It should be noted that the view of Fig. 5 is angularly disposed upon the sheet and its proper horizontal line of vision is indicated by the level of the paste shown in the reservoir. Beneath the reservoir there is provided between the brackets 118 and 119, a hollow heating chamber 124, provided with inlet and outlet pipes 125 and 126 for the admission of steam or other suitable heating medium, to maintain the paste within the reservoir in a liquid condition. The paste-supplying means is mounted upon a shaft 127 journaled at its ends in the brackets 118 and 119 and provided at one end with a gear 128 meshing with the gear 111 of the drum 89, the gear 128 in turn meshing with a pinion 129 provided upon the shaft end of a pasting roller 130, partially submerged in the paste in the reservoir and adapted to feed the paste to the paste applying means. These means it will be understood may be of any suitable construction to apply paste upon the paper at the desired points. In the present embodiment they consist of a roller 131 mounted upon one end of the shaft 127 and a tangentially extending plate 132 secured to the shaft having its end coincident with the plane of rotation of the peripheral surface of the roller 131, and adapted with said periphery to engage the paste feeding roller 130 and carry the paste therefrom to the surface of the paper being fed about the drum 89.

The shaft 127 is removably secured in its bearings by wing-nuts 133 and 134 to permit of its being conveniently taken out of the machine for the purpose of cleaning.

As the lining paper is fed between the drum 89 and the roller 109, it moves on to a downwardly inclined table 135 secured in flush relation upon the upper angularly disposed portion 136 of a bracket member 137 secured by bolts 138 to the inner side of the frame member 37, the upper surfaces of the portion 136 and the table 135 being substantially in line with the underside of one of the radially disposed forms of the form carrier. The bracket 137 has secured to its inner end a slotted guide member 139, the upper end of which is secured in flush relation to the portion 136, being then curved downwardly to form a rounded corner, and being carried for a substantial distance circumferentially about the circular path of the ends of the forms. The member 139 is supported at its circumferential portion by means of a bracket 139ª connected to the lower end of the bracket 137 by means of a threaded adjustable rod 140 to permit of the inward or outward adjustment of said member.

Figure 7:
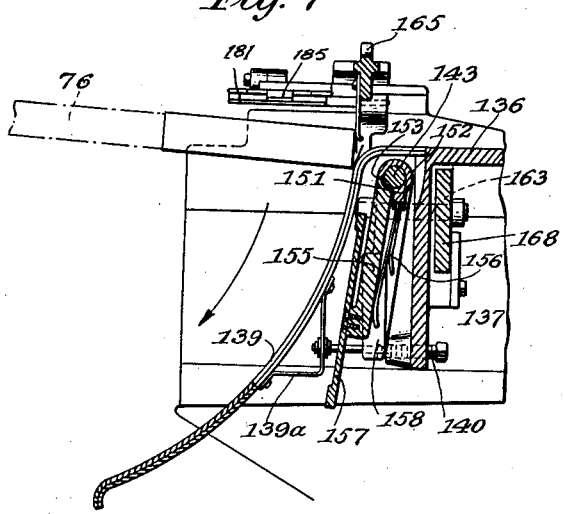
Fig. 7 is a sectional elevation of certain parts, particularly the folding means, as shown in Fig. 5, but in their position during indexing of the form carrier.
Figure 14:
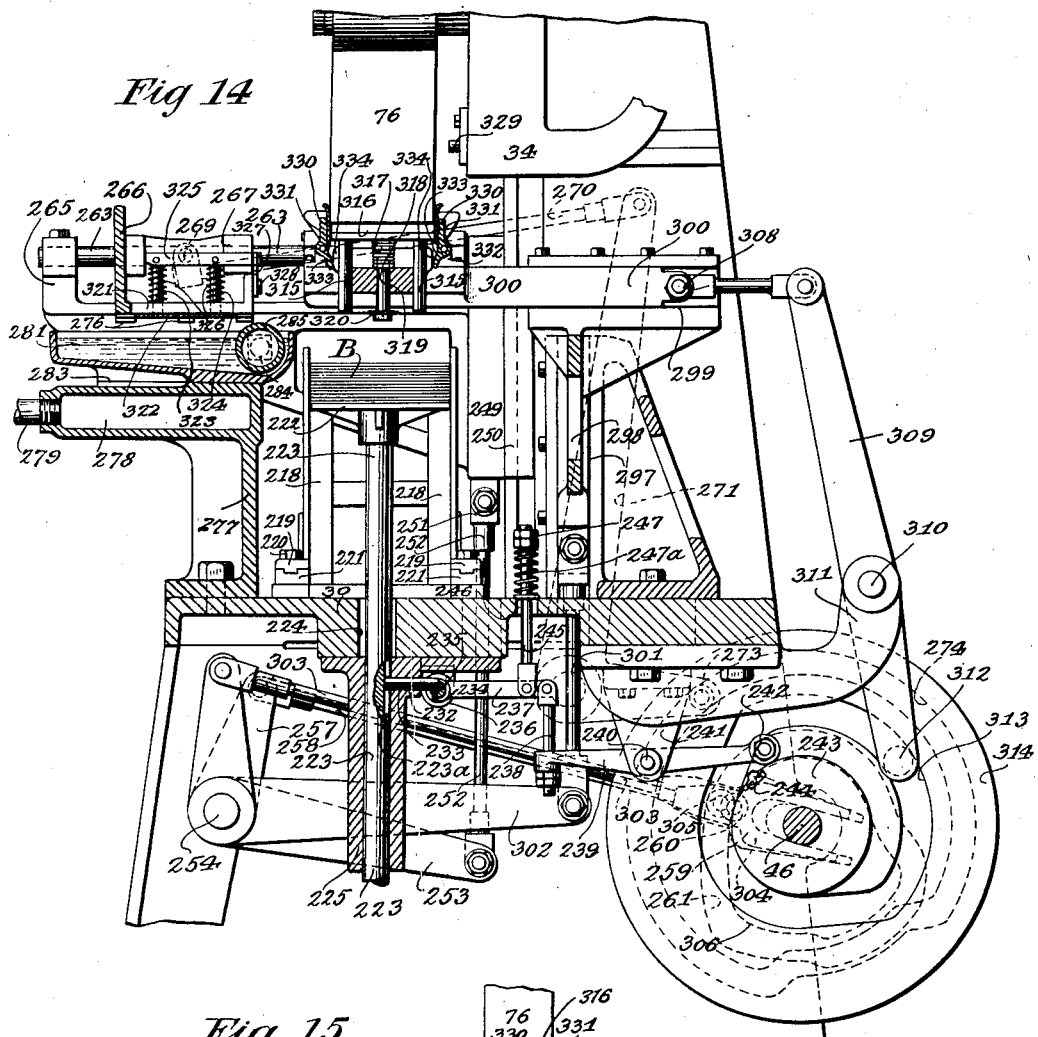
Fig. 14 is a similar view, with portions broken away, and showing the parts in a different operative position.
Figure 15:
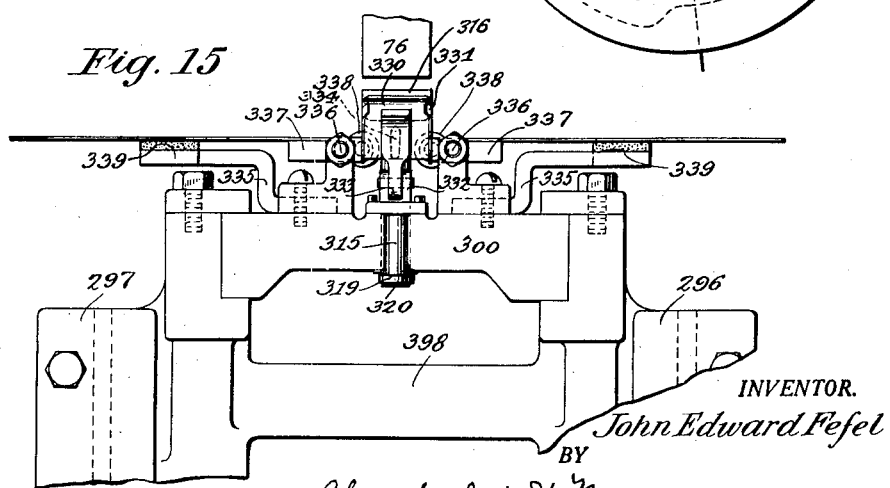
Fig. 15 is an enlarged detail front elevation of the folding mechanism for preliminarily folding the wrappers about the lining, the same being shown in inoperative position.

As the paper is fed inwardly over the table 135 and the portion 136, it moves beneath the form, and is thereupon adapted to be folded about the same by mechanism now to be described. Within suitable bearing portions 141 and 142 of the bracket 137 there is rotatably mounted a shaft 143, one end of which is extended through the frame 37 and is provided with a cam lift member 144 adapted to be intermittently engaged by a cam 145 mounted upon a stud shaft 146 journaled in the frame 37, said shaft being provided with a beveled pinion 147 meshing with a beveled pinion 148 provided upon the shaft 60. Upon its other end the shaft is provided with a spring 149 secured at one end to the shaft and at its other end to the bearing portion 142 of the bracket 137, and adapted to normally maintain the shaft 143 in its counter-clock-wise position as indicated in Fig. 7, the intermittent engagement of the cam 145 with the cam lift 144 being adapted to rotate the shaft 143 through a partial revolution to its clock-wise moved position as indicated in Fig. 5, in which position holding and folding means carried upon the shaft are adapted to function. On the intermediate section of the shaft 143 there is secured a collar 151 provided with a tangential extension portion 152 and an arcuate recess 153, and on each side of said collar the forked ends 154 of an arm 155 are mounted upon the shaft 143 for relative rocking movement thereon. The base of said arm 155 is movably engaged within the recess 153 and normally abuts the wall thereof opposed to the tangential extension 152, as indicated in Fig. 7, a leaf spring 156 secured in said tangential extension bearing upon the underside of said arm. This arm 155 is relatively narrow to allow it to move through the slot of 139, and has secured upon its end a plate 157 adapted as the arm is moved in a clock-wise direction to press the lining paper against the underside of the form as indicated in Fig. 5. As the plate 157 engages the form, holding the paper thereon, the movement of the arm 155 is stopped, but a slight further movement of the shaft 143 is permitted, which movement is utilized for operating a pair of folding arms 158 and 159 secured to the shaft 143 in such position as to move at each side of the member 138, and so spaced that they engage the underside of the form adjacent its edges. At each outer side of said arms there are secured vertically disposed folding plates 160 and 161 respectively, adapted to engage the sides of the form, thereby folding the sides of the lining paper upwardly about the same.

The portions of the paper extending above the upper surface of the form are now adapted to be folded inwardly, and by the same operation the ends of the side portions of the wrapper are adapted to be folded inwardly upon the end of the form as indicated in Fig. 28. For this purpose there are provided in suitable bearing bosses of the bracket 137 a pair of rocker shafts 162 and 163, upon the inner ends of which there are respectively secured folding arms 164 and 165, and provided upon their outer ends with pinions 166 and 167. A sliding rack member 168 is mounted for reciprocatory movement in a passage 169 of the frame 37 and is provided at one portion with an upwardly extending rack 168ᵃ meshing with the pinion 166. The rack member is angularly bent intermediate its ends, so that its inner portion is parallel with but at a different level from the portion upon which the rack 168ᵃ is secured, and upon this inner portion there is provided a downwardly extending rack 170 meshing with the pinion 167, so that reciprocatory movement of the rack member will simultaneously impart rotary movement to the arms 164 and 165 in opposite directions, that is both arms will be simultaneously moved inwardly and simultaneously moved outwardly. The outer end of the rack member has secured thereto a U-shaped yoke member 171, which embraces the shaft 60 and upon which there is provided a roller 172 adapted to ride upon a cam 173 carried upon said shaft, this roller being constantly engaged with said cam by means of a coil spring 174 tied between a pin 175 secured to the yoke member and a hook 176 secured to the frame member 37.

Figure 4:
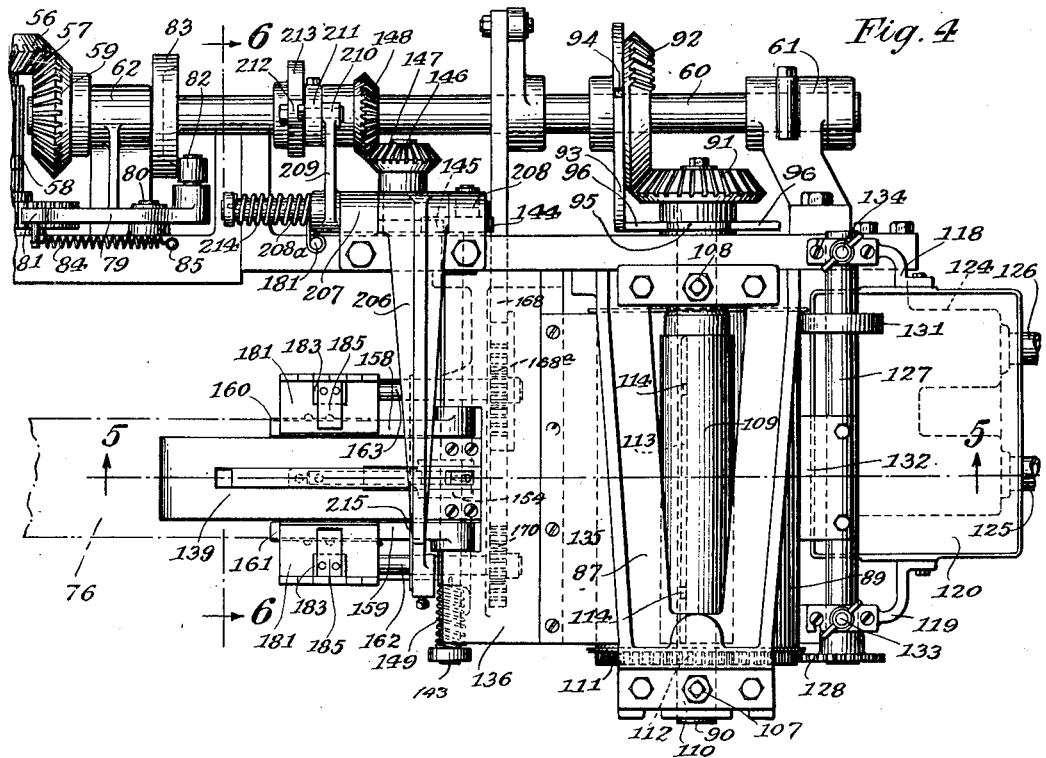
Fig. 4 is an enlarged plan view of the upper right hand portion of the machine, showing the lining-paper feeding, paste-applying, cutting, and folding mechanisms.

Upon the upper end of each arm 164 and 165 there is provided a bar 177 of rectangular cross-section having a cylindrical shank 178 at one end secured in a corresponding opening of the arm, and adjustably secured in said opening by means of a set-screw 179. Upon the outer side of this bar 177 there is secured a hinge plate 180, to which end is hinged an inwardly projecting plate 181 having its inner end slightly curved, as at 182, and being provided adjacent its hinge with a rectangular cut-out portion 183, as indicated in Fig. 4, and within which portion there is secured to the bar 177 a leaf spring 185 projected inwardly and bearing downwardly upon the upper surface of the plate 181, so that upward yielding movement of said plate is permitted.

As the arms 164 and 165 are rotated inwardly the plates 181 engage the upwardly folded side portions of the lining paper and fold the same downwardly upon the upper side of the form, their action being such as to move inwardly with a wiping effect, that is with sliding yielding pressure. One of the plates 181 is fed slightly in advance of the other, so that the unpasted side of the lining paper is folded down first, thereby insuring proper super-imposing of the pasted edge of the other side.

Simultaneously with the folding in of the sides of the paper, the projecting end portions of the sides are folded inwardly forming gusset folds upon the ends of the form by means of projecting folding plates 186 secured to the arms 164 and 165 and having their rounded projecting portions so disposed as to engage the end of the form.

Each of the forms is provided at its upper and lower side with means for holding the pouch elements being folded thereon at the several stations during the rotation of the carrier. The means for the several forms are of similar construction and each consist of arms 187 pivotally mounted upon pins 188 engaged in the discs 69 and 70 above and below the form and projecting at their ends beyond the outer surfaces of said discs. Upon the forward projecting portions of said pins there are secured toggle lever arms 189 connected at their ends by means of a spring 190, and upon their rearwardly projecting ends said pins are provided with operating levers 191 extending in opposed directions to the levers 189, and respectively provided with roller ends 192 spaced from each other and adapted to be engaged by operating means for actuating the arms. Upon the outer ends of the arms 187 holding plates 193 are respectively provided, these plates being flanged at their sides, as at 194, and pivotally mounted upon the arms by means of pins 195 engaged in the arms and said flanges of the plates, the outer ends of the plates being yieldably pressed outwardly by means of cushion springs 196 engaged in sockets 197 formed in the ends of the respective arms and bearing upon the under side of the plate. The holding arms are adapted to be actuated by preliminary pressure being applied to the levers 191 sufficient to rotate the pins 188 to a point where the center upon the end of the lever 189 to which the spring 190 is secured is carried over the center of the pin 188, whereupon the spring 190 will complete the movement of the arms with a relatively quick snap action. This same operation occurs in either closing or opening of the arms.

Following the folding of the lining paper about the form to the point thus far described, the upper holding arm 187 is adapted to be actuated to closed position for the purpose of retaining the folded sides of the paper in folded position and applying pressure to the pasted edge to secure the same. The mechanism for actuating this arm to its closed position is shown in detail in Figs. 8 to 12 and consists of a lever 198 pivotally mounted upon the super-structure 34 at 199 and provided at its upper end with a pin 200 adapted upon rotation of said lever in counter-clockwise direction as shown in Fig. 9 to impart rotary movement to the arm 187 to such point at which the action of the spring 190 comes into play, thereby causing the said arm to move to closed position upon the upper surface of the former. The shaft 57, heretofore referred to and driven from the shaft 51, is provided at its inner end with a cam carrying collar 201, which is engaged by the forked end 202 of a link 203 pivotally connected to the lower end of the lever 198. Upon the link 203 there is provided a roller 204, which rides upon a cam 205 formed upon the collar 201 and adapted to reciprocate the link 203 to and fro thereby oscillating the lever 198, so that in proper timed relation the pin 200 at its end successively engages the pins 192 of the upper arms 187 of the several forms as they are successively positioned in relation to the lining feeding and folding mechanism, to close the upper holding means upon said form.

The next folding operation upon the lining consists in folding down the projecting end of the upper pasted folds upon the outer end of the form, and for this purpose an arm 206 is pivotally mounted in brackets 207 and 208 secured upon the frame 37, the pivotally mounted shaft 208ᵃ of said arm projecting beyond the bracket 207, and being provided with a lever 209 projecting above the shaft 60 pivotally connected at 210 to a yoke member 211, which latter embraces the shaft 60 and is provided with a roller 212 which rides upon a cam 213 secured to said shaft, the roller being constantly engaged with the cam by means of a coiled spring 214 coiled about the shaft 208ᵃ and having one end fixed to the shaft while the other end is fixed to the frame. The arm 206 has secured to its inner end a folding plate 215, adapted upon downward movement of said arm to engage the forward end of the former and thereby fold down the upper portion of the lining to form the same as shown in Fig. 29.

At this point the carrier, which has been stationary during the several folding operations, is indexed to its next position, the pouch lining being held upon the form by means of the holding arm 187, which has been closed down upon the same as above pointed out, and the several folding mechanisms, with the exception of the arm 206 which remains in engagement with the end of the form until the same starts to move away, having been moved to their inoperative positions. As the form moves to its next position the end of the same engages the circumferential member 139, and as the same passes over the rounded corner of said member the projecting lower flap of the pouch end, which contains paste along its edge, is folded upon the end of the form and in pasted relation with the previously folded end folds of the pouch, the pressure between the end of the form and the member 139, which continues until the form moves out of engagement with said member pressing the folded end of the pouch sufficiently to insure its being sealed as shown in Figs. 7 and 30. As the form starts to move from the position at which the lining paper is folded about the same, the small connection portions between the lining paper being folded into pouch form and the lining paper for the pouch to be next formed are severed, these connection portions having functioned during the folding of the pouch lining to maintain the flat position of the next lining so that it is in proper relation to be fed into relation to the succeeding form as it moves into place.

As the form carrying the folded pouch lining moves to its second position, at which it is vertically disposed and dependent, the holding arm 187 and its plate 193 are moved to open position by means of a stud 216 mounted on a bracket 217 secured to the super-structure 34, said stud engaging the pin 192 of the arm 191 as the form approaches said second position, and moving the arm 187 to a point where the spring 190 completes its opening movement. The pouch lining is now in position to have the wrapper folded about it.

The pouch wrappers B are placed in the machine in stacked form within a vertically disposed container guide comprising vertically disposed corner pieces 218 of right angular cross section secured at their bases to horizontally disposed slides 219 adjustably secured by bolts 220 in grooved tracks or ways 221 mounted upon the table portion 30 of the base, and adapted to permit of adjustment of said corner pieces to accommodate wrappers of different sizes. Within the container guide there is provided a vertically movable table 222 mounted upon the upper end of a vertical plunger 223 extending through an opening 224 in the base and having sliding bearing in a tubular cylindrical bearing member 225 secured to the under side of the table. At the lower end of the plunger 223 there is secured a handle member 226 adapted to permit of manual raising and lowering of the table for the purpose of inserting the wrappers, and to an eyelet 227 secured thereto is attached one end of a cable 228 extending over a pulley 229, rotatably mounted in a bracket 230 formed integral with the attaching plate of the member 225, and to the lower end of which cable there is secured a weight 231 adapted to exert an upward force upon the plunger 223 and table 222 to normally press the wrappers upwardly in the container guide.

The table 222 and its plunger 223 are intermittently held against upward movement in the intervals between the wrapper feeding operations, hereinafter more fully described, by means of intermittently operated mechanism, comprising a gripping plug 232 slidably mounted in a passageway 233 formed in the member 225 and adapted to be engaged at one end with a key slot 233$^a$ in the plunger 223 and engaged at its other end in a right angular cut-out 234 provided in a horizontally disposed shaft 235 mounted for rocking movement in bearings 236 formed upon the underside of the attachment plate portion of the cylindrical bearing member 225. An arm 237 is secured to said shaft 235 and is pivotally connected at its end to a vertically disposed connecting rod 238 adjustably connected at its lower end to one end of a lever arm 239 pivotally mounted at 240 in a bracket 241 secured to and suspended from the underside of the table portion 30, said arm being provided at its other end with a roller 242, which rides upon a cam member 243 secured to the shaft 46 and provided at one point with a tripping projection 244. The arm 237 is pivotally connected adjacent its end to a vertically disposed rod 245 extending upwardly through an opening 246 in the table portion 30 and provided between the adjustable lock nuts 247 secured to its end and the upper surface of said table, with a coil spring 247$^a$ exerting an upward pressure upon said rod, which in turn is adapted to rock the arm 237 so that the vertical face of the right angular recess 234 of the shaft 235 is pressed inwardly against the end of the plug 232 to grippingly engage it within the key slot of the plunger 223, said spring also serving to maintain the roller 242 in engagement with the surface of the cam 243. Upon each rotation of the shaft 46 the projection 244 rocks the lever 239, imparting a slight rotation to the arm 237 in a clockwise direction, which moves the vertical face of the recess 234 out of engagement with the end of the gripping plug thereby releasing it to permit the table 222 to move upwardly under the lifting force of the weight 23. Simultaneously with this lifting movement feeding mechanism, presently to be described, is actuated for removing the uppermost of the wrapers from the stack to a position relative to the form 76 carrying the folded pouch lining.

Upon the standards 32 and 33 of the main supporting frame of the machine there are respectively provided vertical tracks or slideways 248 and 248$^a$, within which there are mounted for vertical reciprocation the rearwardly disposed ends of forwardly projecting bracket members 249 and 249$^a$, the flanged rearward bases of said members being retained within said slideways by means of gib plates 250. These brackets are adapted to be vertically reciprocated for the purpose of moving the wrapper feeding mechanism into and out of relation with the stack of wrappers and the pouch carrying form; and also into and out of relation with the paste mechanism for applying paste to the wrappers. These members 249 and 249$^a$ are preferably formed of aluminum or other relatively light material, and to the lower end of the base of each of them there is pivotally connected the forked end 251 of a link 252, connected at its other end to a bell crank lever 253 loosely mounted upon a shaft 254 journaled in suitable bearings 255 and 256 of the supporting legs 31 of the base of the machine. The short-arm 257 of the bell crank lever is pivotally connected to one end of a connecting rod 258 provided with a forked portion 259 at its other end which slidingly embraces the shaft 46, and is provided with a roller 260 which rides within a cam groove 261 of a cam carrying disc 262 mounted upon said shaft 46.

At the upper sides of the bracket members 249 and 249$^a$ there are respectively provided horizontally disposed guide rods 263 and 264 having their ends mounted in suitable upwardly extending supporting portions 265 of the members. Extending between and slidably supported upon these guide rods 263 and 264 there is provided a transversely disposed paste-applying and feeding member comprising a transversal bridging portion 266 and end portions 267 and 268 having passages therethrough in which are engaged the guide rods 263 and 264. To each of the end portions of said wrapper feeding member there is pivotally connected at 269 one end of a connecting rod 270, the other end of which is pivotally connected to the upper end of a bell crank member 271 pivotally mounted at 272 at the side of the base of the machine, and provided at the end of its short arm with a roller 273 which rides in a cam groove 274 of a cam disc 275 secured upon the shaft 46. It will be seen that the bell crank lever 253 is adapted to impart vertical reciprocatory movement to the bracket members 249 and 249$^a$ to raise and lower the wrapper feeding member and that the bell crank lever 271 is adapted to impart horizontal reciprocatory movement to said member. The path of movement of said member is indicated by the diagram, Fig. 19. The arm 117, previously described, intermittently oscillating the feed roller 99 for the pouch lining paper A, is secured to the bell crank lever 271 at one side to receive movement therefrom.

The feeding member first moves upwardly from contact with the wrapper stack to move the uppermost wrapper upwardly into relation with the form 76 where it is engaged by suitable folding mechanism, presently to be described, then moves forwardly to a point above the paste supplying mechanism, also presently to be described, downwardly into relation with said mechanism, inwardly to a point again above the stack, and again downwardly into relation with the stack to engage the next wrapper to be fed.

At the under side of the wrapper feeding member there are secured a plurality of paste applying portions 276 adapted to apply paste at suitable points upon the uppermost wrapper of the stack, and through the adhesive action of said paste to lift said wrapper into relation with the form 76. The parts of the wrapper which receive paste are indicated in Fig. 31 and include strip portions extending along the side edges of the wrapper at one side of the center, spot portions disposed at a plurality of points along the center line of the wrapper, and spot portions disposed at two spaced points along each edge of the wrapper at the other side of the center.

Between the brackets 249 and 249ª and forwardly of the stack container guide 218, there is secured upon the table portion 30 of the base a bracket 277 having integrally formed at its upper portion a horizontally disposed hollow heating chamber 278 having inlet and outlet connections 279 and 280 for the admission and emission of a suitable heating medium as steam, and upon the upper side of said heating chamber there is removably mounted a paste containing reservoir 281, provided at its underside with a dove-tailed rib 282 slidably engaged in a dove-tailed groove 283 formed in the upper side of said chamber to permit of the reservoir being readily removed for the purpose of cleaning. At the inner end of said reservoir there is journaled a shaft 284 upon which there are mounted paste rollers 285, and upon the outer end of said shaft there is provided a gear 286 meshing with a gear 287 journaled upon a stud shaft 288 supported at one side of the chamber 278, said stud shaft being further provided with a sprocket gear 289 over which an endless sprocket chain 290 extends from a sprocket gear 291 secured upon the shaft 254, which is driven from the rear drive shaft 41 by a sprocket chain 292 extending over gears 293 and 294 on said respective shafts 254 and 38. Through this train of gearing the paste applying rollers 285 are continuously rotated. A hand-wheel 295 is provided at the end of the shaft by means of which the entire mechanism of the machine may be manually operated when desired.

As the wrapper feeding member moves rearwardly along its lower traverse the paste supplying portions 276 contact with the surfaces of the rollers 285 so that paste is applied thereto. The feeding device then moves downwardly into engagement with the uppermost wrapper upon the stack and simultaneously with this engagement and during which there is a short dwell of the member, the releasing mechanism for the table 222 and the plunger 221 is operated by the cam projection 244 to momentarily permit the table to move upwardly under the force of the weight 231, so that a pressure impulse is applied between the wrapper and the paste containing points 276 of the feeding member to insure adhesion of the wrapper. After such impulse the table 222 is immediately locked by the plug 232 against further upward movement, and thereupon the feeding member moves upwardly, carrying with it the wrapper to a point directly beneath the form 76.

At this point folding mechanism, for folding the wrapper into pouch form about the pouch lining, is moved into relation with the form.

Upon the inner sides of the vertical standards 32 and 33 there are provided vertically disposed tracks or slideways 296 and 297 in which there is mounted for vertical sliding movement a slide member 298 provided at its upper end with a horizontal slide-way 299 in which a slide 300 is mounted for horizontal movement. At the lower end of the vertical slide 298 there is pivotally connected adjacent each side the upper end of a push rod 301 having its lower end pivotally connected to a bell crank 302 loosely mounted upon the shaft 254 and having its short arm pivotally connected to one end of a connecting rod 303, the other end of which is forked as at 304 and slidingly embraces the shaft 46, a roller 305 having provided upon this forked portion which rides in a cam groove 306 of a cam disc 307 mounted on the shaft 46.

The horizontal slide 300 is pivotally connected by a link 308 to the upper end of a lever 309, pivotally mounted at 310 upon a bracket 311 and provided at its lower end with a roller 312 which rides in a cam groove 313 of a cam disc 314 mounted on the shaft 46. The action of the bell crank 302 and the lever 309 is to impart vertical and horizontal reciprocatory movements to the slide member 300.

At the forward portion of the slide 300 there is mounted upon vertically movable plungers 315, a vertically depressible platform 316 normally maintained in its raised position by means of a spring 317 coiled about a plunger 318 secured to the underside of said platform and extending through a passage 319 in the slide, said plunger being provided at its lower end with an enlargement 320 adapted to limit the upward movement of the platform.

As the wrapper feeding device completes its upward movement and brings the wrapper into relation with the end of the form, the horizontal slide 300 is moved forwardly into relation beneath the form, so that the platform 316 is in position to be raised into holding relation with the wrapper against the end of the form. Thereupon the vertically movable slide 298 is raised and engages the platform 316 with the wrapper against the form. The wrapper feed member is provided centrally with a cut-out 321 opening rearwardly and which embraces the form and is adapted to permit forward movement of the member out of relation to the form.

At this point the wrapper feeding member has a further upward movement which serves to actuate stripping means to insure removal of the wrapper from the paste containing points. This stripping means comprises plates 322 disposed at the underside of said member near its ends and respectively provided with vertical plungers 323 and 324 extending upwardly through the base of said member and connected at their upper ends to an arm, coiled springs 326 being provided about said plungers between the arm 325 and the upper side of the member, and which normally press the stripper plates into engagement with the underside of said device so that the paste applying portion 276 project free. The ends of the arms 325 project rearwardly of the member and have integrally formed levers 327 bent therefrom and pivotally mounted upon brackets 328 secured at each end of the member, said levers being adapted as the member reaches its uppermost position to be engaged by stationary pins 329 mounted upon the superstructure 34 and depressed thereby, whereby the stripper plates are depressed beneath the surfaces of the paste applying portion 276 to insure disengagement of the wrapper therefrom. Simultaneously with such disengagement the platform 316, which has moved into relation with the former, grips the wrapper, and the wrapper feeding member thereupon moves forwardly out of relation with the former.

At the respective forward and rearward ends of the platform 316 folding fingers 330 are pivotally mounted at 332 upon the horizontal slide 300, each being provided with side flanges 331. Each finger is further provided with a projection 333 adapted to be engaged by a cam portion 334 provided upon each of the plungers 315 as the horizontal slide is moved upwardly relatively to the platform, 316, which latter is held stationary against the end of the form. The fingers are thereby moved inwardly against the vertical ends of the form and the wrapper is thus folded inwardly at these points about the end of the form to form gusset folds.

At each side of the platform 316 there is provided a bracket 335 upon which there is pivotally mounted at 336 a folding arm 337 provided at its inner end with a roller 338 projected inwardly with respect to the edge of the platform 316 and disposed beneath the same, and having its other end resting upon an angular extension 339 of the bracket 335. As the slide moves upwardly relatively to the stationary feed platform 316, and substantially simultaneously with the operation of the folding fingers 330, the rollers 338 of the arms 337 are engaged by the underside of the platform, and the arms are thereby swung upwardly into engagement with the vertical sides of the form to fold the sides of the wrapper about the same, as indicated in Fig. 32. When so folded the pasted spots upon the wrapper adhere to the lining portion of the pouch and thereby maintain the folded relation of the sides of the wrapper until the final folding operations upon the same are completed.

The folding mechanism now moves out of relation with the form, the adhesion of the pouch wrapper to the pouch lining being sufficient to maintain its position temporarily, and thereupon the holding arms 187 at each side of the form are adapted to be moved to closed position to hold the pouch elements thereon during indexing of the carrier to the next station.

For this purpose a slide member 340 (Figs. 8 to 12) is mounted for vertical movement in a slideway 341 provided upon the super-structure 34 and is provided at its upper end with a longitudinal opening 342 engaged about a cam 343 provided upon the shaft 57, said member being normally drawn downwardly into engagement with said cam by means of coiled springs 344 and 345 connected at each side thereof and to suitable hooks 346 secured to the sides of the slideway. Upon the forward side of said slide there is secured an upwardly extending member 347 adapted as the slide moves upwardly to engage the pins 192 provided upon the levers 191 to impart initial closing movement to the arms 187, the closing of said arms being completed through the action of the spring 190 as heretofore pointed out.

The carrier is now indexed to move the form upon which the pouch lining and the partially folded wrapper are carried to the next station where the folding of the wrapper is completed and the completed pouch is stripped from the form.

Upon the bracket 38 there is secured a bearing plate 348 having a slideway 349 extending longitudinally of the bracket and in the plane of the form supporting the folded pouch and in which slideway stripping mechanism hereinafter to be described, is adapted to move. Above and below said slideway the plate 348 is provided with tubular bearing bosses 350 and 351 in which are journaled shafts 352 and 353 provided at their respective forward ends with arms 354 while at their rearward ends there are respectively provided pinions 355 and 356, the rearward ends of said shafts being journaled in a bearing fixture 357 secured to the rearward side of the bracket 38.

A vertical slideway 358 is provided in the fixture 357 in which two vertically reciprocating racks 359 and 360 are slidably mounted and retained by means of a cover plate 361, the teeth of one rack being disposed at one side and meshing with the pinion 355, while the teeth of the other rack are disposed at the other side and mesh with the pinion 356. At the lower ends of the racks there are respectively provided rollers 362 and 363 which ride upon cams 364 and 365 secured upon the end of the continuously rotated shaft 51, being retained in engagement with said cams by means of springs 366 and 367 tied between the upper ends of the racks and suitable anchor pins secured in the cover plate 261. The cams are so designed that the upper shaft 352 is oscillated in advance of the lower shaft 353, so that the upper arm 354 moves into relation with the form in advance of the lower arm 354.

Upon each of the arms 354 there is mounted a folding device for folding in the side flaps of the wrapper from the position shown in Fig. 32 to the completed position shown in Fig. 33. This device comprises a center bar 368, to the center of which the end of the arm 354 is pivoted, as at 369, said bar being mounted for relative movement toward and away from the body plate 370 of the device within a slotted rib 371 formed on said plate. The body plate is recessed longitudinally along each side, as at 372, and is flanged at its ends, as at 373 and 374, and upon the inner side of said flanges there are pivotally mounted by means of pivot screws 375 the in-turned flange ends 376 of side folding plates 377 and 378. The upper ends of the plates are pivotally connected to the outer ends of toggle links 379 and 380, the inner ends of which are overlapped and pivotally connected to the ends of the center bar 368, and springs 381 are tied between said upper ends of said folding plates which normally draw the upper edges of the plates inwardly and spread the lower edges, as shown in Figs. 24 and 25, and at the same time contract the toggle links to raise the center bar relatively to the body plate. A leaf spring 382 secured upon the arm 354 and bearing upon the forward end of the center bar yieldably maintains the position of the folding device relatively to the arm and permits relative rocking movement of the device as it is engaged with the form.

In the operation of the folding devices the upper one moves in advance of the lower one, so that it folds in the upper flaps which only contain paste spots at their ends, moving out of relation to the form as the lower device moves into relation to fold in the lower flaps and paste them to the folded upper flaps. As the folding device moves into relation with the form the side folding plates are spread at each side thereof and are closed by abutment of the body plate therewith, the continued closing movement of the arm 354 and the center bar tending to straighten out the toggle links and thereby impart a closing movement to the side plates to fold in the flaps. Upon the disengaging movement of the device the side plates first move to their open or spread position through the action of the springs 381, so that there is no tendency to withdraw or otherwise derange the folded flaps.

The completed pouch is now ready to be removed from the form by means of stripping mechanism, presently to be described, but prior to the stripping and just after the folding devices have moved out of relation with the form, the holding arms 187 which have been engaged at each side of the form during the last folding operation, are adapted to be moved to open position. For this purpose a lever 383 is pivoted upon the superstructure 34, and has pivotally connected to it one end of a link 384 said link being forked at its other end and embracing the collar 201 of the shaft 57. A roller 385 is provided upon said forked end which rides upon a cam 386 formed upon the collar 201 and adapted to reciprocate the link to and fro, so that in proper timed relation the lever 383 is operated to engage a lug 387 formed upon its end with the pins 192 of the arms 187, moving the latter in opening direction to a point where the spring 190 completes such opening movement.

The stripping mechanism consists of a reciprocating slide 388 mounted for sliding movement in the slideway 349, and pivotally connected by a link 389 to the end of a lever 390 pivotally mounted upon the bracket 38 at 391 and connected by a link 392 to a bell-crank lever 393. The shaft 394 of the bell-crank lever is pivotally mounted in a bearing 395 of the superstructure 34, its upper arm being disposed at the forward side of said structure while its lower arm is disposed at the rearward side. Said lower arm is slotted, as at 396, and has adjustably and pivotally connected thereto the upper end of a connecting rod 397, said rod being eccentrically connected at 398 to the outer side of the cam disc 275 secured upon the end of the counter shaft 46. The connecting rod 397 is longitudinally adjustable by means of turn buckle 399.

The slide 388 is provided with a laterally projecting arm 400 having a tubular hub portion 401 formed therein and at each side of which there is pivotally mounted at 402 an arm 403 having a stripper finger 404 secured at its forward end, and provided at its rearward end with a projecting portion 405 having a set screw 406 therein which contacts with a slide rod 407, the set screws of the two arms being held in engagement with said rod by means of a spring 408 tied between the portions 405 of said arms.

The slide rod is provided at its forward end with an enlarged portion 409 slidably engaged in the tubular hub portion 401, a beveled neck portion 410 adjacent said portion 409, and a reduced portion 411 adjacent said neck portion, the other end of said rod having sliding bearing in the tubular bearing end 412 of a bracket arm 413 secured at the upper side of the slideway 409.

Spaced and adjustable stop nuts 414 and 415 are provided upon the rod for abutment with the bearing 412 in the respective forward and rearward positions of the stripper. Fig. 22 indicates the normal retracted and open position of the stripping device in which the slide rod has been moved forwardly relatively to the sliding arm 400 by engagement, during the rearward movement, of the nut 414 with the bearing 412, so that the set screws 406 engage the reduced portion 411 of the slide rod 407 to open the stripper arms. As the slide is reciprocated forwardly to bring the arms about the sides of the form, this open position is maintained, until the stop nut 415 engages the bearing 412, whereupon the slide continues its forward movement relatively to the slide rod, and the arms are closed through the wedging action of the beveled neck portion 410 between the set screws as shown in Fig. 21, the stripper finger ends 404 being engaged with the sides of the form adjacent the end of the pouch. The slide is now reciprocated rearwardly, and during this rearward movement the closed position of the arms is maintained until the nut 414 again engages the bearing 412, and the pouch is thus stripped from the form.

As the pouch is stripped from the end of the form, it falls on an inclined chute 416, secured by a fixture 417 to the bracket 38, and is carried by this chute to a conveyor, or to a suitable receptacle.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. In a pouch forming machine, a rotatable form carrier including a plurality of mandrel forms radially disposed about a common axis and adapted to be intermittently indexed to successively bring said forms to a plurality of stations, means at one station adapted to feed material into relation with one of said forms, folding means adapted to fold said material into pouch form about said form, means at another station adapted to feed material into relation with one of the forms containing the folded pouch formed from said first material, and folding means adapted to fold said material into pouch form about said form and the pouch thereon.

2. In a pouch forming machine, a rotatable form carrier including a plurality of mandrel forms radially disposed about a common axis and adapted to be intermittently indexed to successively bring said forms to a plurality of stations, means at one station adapted to feed material into relation with one of said forms, folding means adapted to fold said material into pouch form about said form, means at another station adapted to feed material into relation with one of the forms containing the folded pouch formed from said first material, folding means at said second station adapted to partially fold said material into pouch form about said form and the pouch thereon, and folding means at another station adapted to complete the folding of said material into pouch form.

3. In a pouch forming machine, a rotatable form carrier including a plurality of mandrel forms radially disposed about a common axis and adapted to be intermittently indexed to successively bring said forms to a plurality of stations, means at one station adapted to feed material into relation with one of said forms, folding means adapted to fold said material into pouch form about said form, means at another station adapted to feed material into relation with one of the forms containing the folded pouch formed from said first material, folding means adapted to fold said material into pouch form about said form and the pouch thereon, and stripping means at another station to remove the pouch from the form.

4. In a pouch forming machine, a rotatable form carrier including a plurality of mandrel forms radially disposed about a common axis and adapted to be intermittently indexed to successively bring said forms to a plurality of stations, means at one station adapted to feed material into relation with one of said forms, folding means adapted to fold said material into pouch form about said form, means at another station adapted to feed material into relation with one of the forms containing the folded pouch formed from said first material, folding means at said second station adapted to partially fold said material into pouch form about said form and the pouch thereon, folding means at another station adapted to complete the folding of said material into pouch form, and stripping means at said last station adapted to remove the pouch from the form.

5. In a pouch forming machine, a rotatable form carrier including a plurality of mandrel forms radially disposed about a common axis and adapted to be intermittently indexed to successively bring said forms to a plurality of stations, means at one station adapted to feed material into relation with one of said forms, folding means adapted to fold said material into pouch form about said form, and means at another station adapted to strip the pouch from the form.

6. In a pouch forming machine a rotatable form carrier including a plurality of mandrel forms radially disposed about a common axis and adapted to be intermittently indexed to successively bring said forms to a plurality of stations, means at one station adapted to feed material into relation with one of said forms, folding means adapted to fold said material into pouch form about said form, means at another station adapted to feed material into relation with one of the forms containing the folded pouch formed from said first material, folding means adapted to fold said material into pouch form about said form and the pouch thereon, and stripping means at still another station adapted to remove the pouch from the form.

7. In a pouch forming machine, a rotatable form carrier adapted to be intermittently indexed and including a mandrel form disposed in constant radial relation to the axis of said form carrier, feeding means for feeding a strip of material into relation with said form in the stationary position thereof, folding means adapted to fold the sides of said material about said form, other folding means for imparting end folds along three edges, and means adapted during the indexing movement of the carrier to fold said material along the fourth edge.

8. In a pouch forming machine, a rotatable form carrier adapted to be intermittently indexed and including a mandrel form disposed in constant radial relation to the axis of said form carrier, feeding means for feeding a strip of material into relation with said form in the stationary position thereof, folding means adapted to fold the sides and an end of said material about the form and leaving an end flap unfolded, and means adapted during the indexing movement of the carrier to fold said end fold.

9. In a pouch forming machine, a rotatable form carrier adapted to be intermittently indexed and including a mandrel form disposed in constant radial relation to the axis of said form carrier, feeding means for feeding a strip of material into relation with said form in the stationary position thereof, folding means adapted to fold the sides and an end of said material about the form and leaving an end flap unfolded, and means circumferentially disposed about the circular path of movement of the end of said form adapted during the indexing movement of the carrier to fold said end fold.

10. In a pouch forming machine, a form carrier adapted to be intermittently indexed and including a mandrel form, feeding means for feeding a strip of material into relation with said form in the stationary position thereof, means for partially severing lengths of said material during the feeding whereby the length in relation to said form is partially connected to the adjacent length, and folding means adapted to fold said length about the form, said length of material adapted during the folding thereof to be severed from the adjacent length.

11. In a pouch forming machine, a form carrier adapted to be intermittently indexed and including a mandrel form, feeding means for feeding a strip of material into relation with said form in a stationary position thereof, means for partially severing lengths of said material during the feeding whereby the length in relation to said form is partially connected to the adjacent length, folding means adapted to fold the sides and an end of said length of said material about the form and leaving an end flap unfolded and partially connected to said adjacent length of material, said lengths adapted to be severed by the indexing movement of the carrier, and means adapted during said indexing to fold said end flap.

12. In a pouch forming machine a mandrel form, means for feeding a strip of material into relation with said form and including a pair of rollers, means for intermittently rotating said rollers to feed the strip, paste applying means geared to said rollers and including rotatable pasting means adapted to engage the strip being fed about said rollers to apply paste at pre-determined points upon successive lengths of the strip, cutting means carried upon the other of said rollers adapted to cut said successive lengths, and folding means adapted to fold a length of said material about said form.

13. In a pouch forming machine, a mandrel form, means for feeding a strip of material into relation with said form and including a pair of rollers, means for intermittently rotating one of said rollers, a gear on said roller, means yieldably mounted on said other roller to press it into yielding engagement with said first roller, a gear carried by said second roller meshing with the gear of the first roller whereby the second roller is intermittently rotated, rotatable paste-applying means engaging said first roller, a gear carried thereby adapted to mesh with said gear of the first roller whereby the paste applying means is intermittently rotated to apply paste at pre-determined points to successive lengths of the strip, cutting means carried upon said second roller, adapted to cut said successive lengths, and folding means adapted to fold a length of material about said form.

14. In a pouch forming machine, a mandrel form, means for feeding a strip of material into relation with said form and including a pair of rollers, means for intermittently rotating said roller and including a gear on one of said rollers, pasting means including a removably mounted reservoir, rotatable paste-applying means carried by said reservoir and engaging one of said rollers, a gear carried thereby meshing with a gear upon said roller whereby the paste-applying means is intermittently rotated to apply paste at pre-determined points to successive lengths of the strip, cutting means carried upon one of said rollers adapted to cut successive lengths, and folding means adapted to fold material about said form.

15. In a pouch forming machine, a mandrel form, means for feeding a strip of material into relation with said form and including a pair of rollers, means for intermittently rotating said rollers to feed the strip, cutting means carried upon one of said rollers adapted to cut said strip into successive lengths, a supporting guide for said strip substantially tangential to one of said rollers and extending into relation with one end of said mandrel form in a plane parallel to and substantially co-incident with the plane of one side of said form whereby the strip is fed into relation with said side of the form, and folding means adapted to fold a length of material about said form.

16. In a pouch forming machine, a mandrel form, means for feeding a strip of material into relation with said form, folding means for folding said material about said form and including a rocker shaft, a holding device carried by said shaft adapted to be engaged with said material to retain the same upon said form, side folding members carried by said shaft to engage the sides of the material to fold the same about the form, said holding device being yieldable relatively to said folding members whereby said device and members are moved by said shaft as a unit into and out of relation with said form and said folding members have further movement upon engagement of said holding device with the form, and other folding means adapted to complete the folding of the material about the form.

17. In a pouch forming machine a rotatable form carrier adapted to be intermittently indexed and including a mandrel form, means for feeding a strip of material into relation with said form, folding means for folding said material about said form and including a rocker shaft having its axis parallel to the axis of said carrier, a holding device carried by said shaft adapted to be engaged with the material to retain the same upon said form, side folding members carried by said shaft adapted to engage the sides of the material to fold the same about the form, said holding device being yieldably related to said folding members whereby said device and members are moved by said shaft as a unit into relation with said form and said folding members have further movement upon the engagement of said holding device with the form, and other folding means adapted to complete the folding of the material about the form.

18. In a pouch forming machine, a form carrier including a mandrel form, means for feeding a strip of material into relation with said form, folding means for folding material about said form and including a rocker shaft, a holding arm mounted upon said shaft and having a limited rotary movement thereon, side folding arms mounted on said shaft, a yieldable connection between said side folding arms and said holding arm, said rocker shaft being adapted to move said holding and folding arms into relation with said form whereby said material is held upon said form and folded at the sides, and other folding means adapted to complete the folding of the material about the form.

19. In a pouch forming machine, a rotatable form carrier adapted to be intermittently indexed and including a mandrel form, means for feeding a strip of material into relation with said form, folding means for folding said material about said form and including a rocker shaft mounted out of the path of movement of said form, side folding arms carried by said shaft adapted to be moved by said shaft to fold the sides of the material about said form, and other folding means adapted to complete the folding of the material about the form, said arms adapted during the indexing of said carrier to be moved by the shaft out of the path of said form.

20. In a pouch forming machine, a rotatable form carrier adapted to be intermittently indexed and including a mandrel form, means for feeding a strip of material into relation with said form, folding means for folding said material about said form and including a rocker shaft, a folding arm carried by said shaft adapted to be engaged with the material to retain the same upon said form, side folding members carried by said shaft adapted to engage the sides of the material to fold the same about the form, and means adapted to complete the folding of the material about the form and including a member circumferentially disposed about the path of circular movement of the end of the form adapted during the indexing movement of the carrier to fold an end fold of the material, said member having a slot therein through which said folding arm is adapted to move into and out of relation with said form.

21. In a pouch forming machine, a mandrel form, means for feeding a strip of material into relation with said form, folding means for folding said material about said form and including rocker shafts disposed at each side of said form, arms respectively mounted on said shafts, means for operating said shafts in opposed directions to swing said arms toward and away from each other, and folding means carried by said arms adapted to engage the form to fold the sides of the material at each side inwardly upon the form, and other folding means adapted to complete the folding of the material.

22. In a pouch forming machine, a mandrel form, means for feeding a strip of material into relation with said form, folding means for folding said material about said form and including rocker shafts disposed at each side of said form, arms respectively mounted on said shafts, means for operating said shafts in opposed directions to swing said arms toward and away from each other, folding means yieldably mounted upon said arms adapted to engage said form with a yielding wiping action to fold the sides of the material at each side inwardly upon said form, and other folding means adapted to complete the folding of the material.

23. In a pouch forming machine, a mandrel form, means for feeding a strip of material into relation with said form, folding means for folding said material about said form and including rocker shafts disposed at each side of said form, arms respectively mounted upon said shafts, means for operating said shafts in opposed directions to swing said arms toward and away from each other, folding means carried by the said arms adapted to engage the form to fold the sides of the material at each side inwardly upon said form, other folding means carried by said arms adapted to engage the end of the form at each side to produce gusset folds at each side in the material, and folding means adapted to complete the folding of the material into pouch form.

24. In a pouch forming machine, a rotatable form carrier adapted to be intermittently indexed and including a mandrel form, means for feeding a strip of material into relation with said form, folding means for folding said material about said form and including rocker shafts disposed at each side of said form out of the path of movement of said carrier and form, arms respectively mounted on said shafts, means for operating said shafts in opposed directions to swing said arms toward and away from each other, folding means carried by said arms adapted to engage the form to fold the sides of the material at each side inwardly upon said form, and other folding means adapted to complete the folding of the material into pouch form.

25. In a pouch forming machine, a rotatable form carrier adapted to be intermittently indexed and including a mandrel form, means for feeding a strip of material into relation with said form, folding means for folding said material about said form and including rocker shafts disposed at each side of said form, out of the path of the movement of said carrier and form and having their axes at right angles to the axis of said carrier, arms respectively mounted on said shafts, means for operating said shafts in opposed directions to swing said arms toward and away from each other, folding means carried by said arms adapted to engage the form to fold the side of the material at each side inwardly upon the form, and other folding means adapted to complete the folding of the material into pouch form.

26. In a pouch forming machine, a mandrel from, means for feeding a strip of material into relation with said form, folding means for folding said material about said form and including rocker shafts disposed at each side of said form, arms respectively mounted on said shaft, pinions on said shafts, a reciprocating rack member engaging one of said pinions at the upper side and the other at the under side and whereby said shafts are oscillated in opposed directions to swing said arms toward and away from each other, folding means carried by said arms adapted to engage the form to fold the sides of the material at each side inwardly upon said form, and other folding means adapted to complete the folding of the material into pouch form.

27. In a pouch forming machine, a movable mandrel form adapted to be indexed, means for feeding a strip of material into relation with said form, folding means for folding said material about said form and including means for folding the sides of said material about the form, an arm adapted to move in a plane coincident with the end of said form and in the direction of movement of said mandrel form to fold in an end flap of the material, and other folding means adapted to complete the folding of the material into pouch form.

28. In a pouch forming machine, a rotatable form carrier adapted to be intermittently indexed and including a radially extending mandrel form, means for feeding a strip of material into relation with said form, means for folding said material about said form and including means for folding the sides of said material about the form, an arm adapted to move in a plane tangential to the end of said form and in the direction of movement of said mandrel form to fold in an end flap of the material, and means adapted during the indexing movement of the carrier to fold in the other end flap upon the first end flap, said arm remaining in engagement with said form as the latter is indexed out of relation with it.

29. In a pouch forming machine, a rotatable form carrier adapted to be intermittently indexed and including a radially extending mandrel form, means for feeding a length of material into relation with said form with an end extending beyond the end of said form, means adapted to apply paste to a portion of the end of the said length of material, means for folding the sides of said material about the form, an arm adapted to move in a plane tangential to the end of said form and adapted to fold in an end flap of the material, and means circumferentially disposed about the circular path of movement of the end of said form, adapted during the indexing movement of the carrier to fold in and press the end flap containing said paste upon said folded in end flap, said arm remaining in engagement with said form as the latter is indexed out of relation with it.

30. In a pouch forming machine, a mandrel form, means for feeding a strip of material into relation with said form, means adapted to apply paste to a side edge of said material, means for folding the sides of said material about the form with said pasted side edge overlying the other side edge, a holding and pressure applying member, means for moving said member into engagement with said form to hold and press said overlying edges, and other folding means adapted to complete the folding of the material into pouch form.

31. In a pouch forming machine, a mandrel form, means for feeding a strip of material into relation with said form, means adapted to fold the sides and an end of said material about the form to form a pouch, holding members mounted at each side of said form, and means adapted to engage said members with said form to retain the pouch thereon.

32. In a pouch forming machine, a mandrel form, means for feeding a strip of material into relation with said form, means adapted to fold the sides and an end of said material about the form to form a pouch, holding members mounted at each side of said form, and means adapted to engage said members with said form to retain the pouch thereon, said members being cooperatively related whereby they are adapted to be simultaneously operated, and being further adapted for independent individual operation.

33. In a pouch forming machine, a mandrel form, means for feeding a strip of material into relation with said form, means adapted to fold the sides and an end of said material about the form to form a pouch, holding member pivotally mounted at each side of the form, said members adapted to be moved into and out of relation with said form and being cooperatively related whereby both of them are adapted to be simultaneously operated, and being further adapted for independent individual operation, means for imparting initial partial opening and closing movement to said members, and means connected to said members adapted to automatically complete said closing and opening movement upon the said initial movements being applied.

34. In a pouch forming machine, a mandrel form, means for feeding a strip of material into relation with said form, means adapted to fold the sides and an end of said material about the form to form a pouch, holding members pivotally mounted at each side of said form, toggle members respectively connected to said members, springs connecting the ends of said toggle members, said members adapted to be simultaneously moved into and out of relation with said form, and being further adapted for independent individual operation, and means for imparting initial partial opening and closing movement to said members, said spring adapted upon being moved past the axial centers of said toggle members in either direction to complete said opening and closing movement upon said initial movement being applied.

35. In a pouch forming machine, a rotatable form carrier adapted to be intermittently indexed and including a plurality of radially extending mandrel forms, means for feeding a strip of material into relation with one of said forms in a stationary position of said carrier, means adapted to fold the sides and an end of said material about the form to form a pouch, holding members mounted at each side of said form, and means provided in relation to the stationary positions of said forms adapted to move said members into and out of relation with the form to retain the pouch thereon and permit of its removal.

36. In a pouch forming machine, a rotatable form carrier adapted to be intermittenty indexed and including a plurality of radially extending mandrel forms, means for feeding a strip of material into relation with one of said forms in a stationary position of said carrier, means adapted to fold the sides and an end of said material about the form to form a pouch, holding members mounted at each side of said form, means provided in relation to the stationary positions of said forms adapted to move said members into and out of relation with the forms to retain the pouch thereon and permit of its removal, and stationary means adapted during the indexing of the carrier to move said members to a position opposed to their previously moved position.

37. In a pouch forming machine, a mandrel form, a material container adapted to contain material in stacked sheet form, feeding means for said sheets adapted to move the uppermost sheet into relation with the end of said form, folding means for said sheets adapted to be moved into relation with the end of said form and including means for folding the sheets about two sides of the said form, and other folding means adapted to complete the folding of the sheets into pouch form about the other two sides.

38. In a pouch forming machine, a mandrel form, a material container adapted to contain material in stacked sheet form, feeding means for said sheets, and means for moving said feeding means from said stack to said form and away from said form in a direction at right angles to said movement from the stack to the form, said means adapted during said first movement to feed a sheet into relation with the end of said form, retaining means adapted to be moved into relation with said form to retain said sheet in engagement therewith before the movement of said feeding means away from said form, folding means for folding the said sheet about two sides of said form, and other folding means adapted to complete the folding of the sheet into pouch form about the other two sides.

39. In a pouch forming machine, a mandrel form, a material container adapted to contain material in stacked sheet form, feeding means for said sheets comprising vertically movable supporting means and a horizontal movable slide member carried thereby, means for imparting vertical movement to said supporting means whereby said slide member moves a sheet of material from said stack into relation with said form, means for imparting horizontal movement to said slide member whereby the same is moved out of relation with said form, retaining means adapted to be moved into relation with said form to retain said sheet in engagement therewith before movement of said feeding means away from said form, folding means for folding the sheet about two sides of said form, and other folding means adapted to complete the folding of the sheet into pouch form about the other two sides.

40. In a pouch forming machine, a mandrel form, a material container adapted to contain material in stacked sheet form, feeding means for said sheets including attachment means adapted to attach a sheet to said feeding means, means for moving said feeding means to feed said sheet into relation with the end of said form, stripping means adapted upon the movement of said sheets into relation with said form to strip the same from said attachment means, folding means for said sheets adapted to be moved into relation with the end of said form and including means for folding said sheet about two sides of said form, and other folding means adapted to complete the folding of the sheet into pouch form about the other two sides.

41. In a pouch forming machine, a mandrel form, a material container adapted to contain material in stacked sheet form, feeding means for said sheets including paste applying attachment portions adapted to apply paste to portions of a sheet and attach the same to said feeding means, means for supplying paste to said portions, means for moving said feeding means to feed said sheet into relation with the end of said form, stripping means adapted upon the movement of said sheet into relation with said form to strip the same from said attachment portions, folding means for said sheets adapted to be moved into relation with the end of said form and including means for folding the sheets about the two sides of said form, and other folding means adapted to complete the folding of the sheet into pouch form about the other two sides.

42. In a pouch forming machine, a mandrel form, a material container adapted to contain material in stacked sheet form, feeding means for said sheets comprising vertically movable supporting means and a horizontally movable slide member carried thereby, paste applying attachment portions carried by said slide member adapted to apply paste to portions of a sheet and attach the same to said member, means for imparting vertical movement to said supporting means whereby said slide member moves a sheet of material from said stack into relation with the end of said form, means for imparting horizontal movement to said slide member whereby the same is moved out of relation to the end of said form and back into relation with said stack, paste supplying means adapted to supply paste to said portions during said horizontal movement, retaining means adapted to be moved into relation with said form to retain said sheet in engagement therewith before movement of said feeding means away from said form, folding means for folding the sheet about two sides of said form, and other folding means adapted to complete the folding of the sheet into pouch form about the other two sides.

43. In a pouch forming machine, a mandrel form, a material container adapted to contain material in stacked sheet form, feeding means for said sheets comprising vertically movable supporting means and a horizontally movable slide member carried thereby, paste applying attachment portions carried by said slide member adapted to apply paste to portions of a sheet and attach the same to said member, means for imparting vertical movement to said supporting means whereby said slide member moves a sheet of material from said stack into relation with the end of said form, means for imparting horizontal movement to said slide member whereby the same is moved out of relation with the end of said form and back into relation with said stack, paste supplying means adapted to supply paste to said portions during said horizontal movement, retaining means adapted to be moved into relation with said form to retain said sheet in engagement therewith before movement of said feeding means away from said form, folding means for folding the sheet about two sides of said form, and other folding means adapted to complete the folding of the sheet into pouch form about the other two sides, said member adapted at the end of its horizontal movement to be moved vertically downward into relation with said stack through vertical movement of said supporting means.

44. In a pouch forming machine, a mandrel form, a material container adapted to contain material in stacked sheet form, feeding means for said sheets comprising vertically movable supporting means and a horizontally movable slide member carried thereby, paste applying attachment portions carried by said slide member adapted to apply paste to portions of a sheet and attach the same to said member, means for imparting vertical movement to said supporting means whereby said slide member moves a sheet of material from said stack into relation with the end of said form, means for imparting horizontal movement to said slide member whereby the same is moved out of relation to the end of said form and back into relation with said stack, paste supplying means adapted to supply paste to said portions during said horizontal movement, retaining means adapted to be moved into relation with said form to retain said sheet in engagement therewith before movement of said feeding means away from said form, folding means for folding the sheet about two sides of said form, other folding means adapted to complete the folding of the sheet into pouch form about the other two sides, said member adapted at the end of its horizontal movement to be moved vertically downward into relation with said stack through vertical movement of said supporting means, and means adapted to impart an upward feeding movement and impulse to said stack upon movement of said member into relation therewith.

45. In a pouch forming machine, a mandrel form, a material container adapted to contain material in stacked sheet form, feeding means for said sheets, and means for moving said feeding means from said stack to said form and away from said form in a direction at right angles to said movement from the stack to the form, said means adapted during said first movement to feed a sheet into relation with the end of said form, retaining means adapted to be moved into relation with said form to retain said sheet in engagement therewith before the movement of said feeding means away from said form, folding means for folding the said sheet about two sides of said form, other folding means adapted to complete the folding of the sheets into pouch form about the other two sides, weight means for feeding said stack upwardly, intermittently releasable holding means for retaining the position of said stack and adapted to release it upon engagement of said feeding means therewith whereby an upward impulse is exerted upon said stack.

46. In a punch forming machine, a mandrel form, means for feeding a sheet of material into relation with the end of said form, retaining and folding means for said sheet comprising a vertically movable support and a horizontally movable slide member carried thereby, means for imparting horizontal movement to said slide member to bring it into relation beneath said form, means for imparting vertical movement to said support to bring said member into engagement with said form, and means carried by said member adapted to fold said sheet about said form.

47. In a pouch forming machine, a mandrel form, means for feeding a sheet of material into relation with the end of said form, retaining and folding means for feeding a sheet comprising a vertically movable support and a horizontally movable slide member carried thereby, means for imparting horizontal movement to said slide member to bring it into relation beneath said form, means for imparting vertical movement to said support to bring said member into engagement with said form, retaining means on said member having relative vertical movement, and folding means actuated by said relative vertical movement to fold the sheet upwardly about two sides of the form, and other folding means adapted to complete the folding of the sheet into pouch form.

48. In a pouch forming machine, a mandrel form, means for feeding a sheet of material into relation with the end of said form, retaining and folding means for feeding a sheet comprising a vertically movable support and a horizontally movable slide member carried thereby, means for imparting horizontal movement to said slide member to bring it into relation beneath said form, means for imparting vertical movement to said support to bring said member into engagement with said form, retaining means on said member having relative vertical movement, folding means actuated by said relative vertical movement to fold the sheet upwardly about two sides of the form, other folding means carried by said member adapted through said relative vertical movement to produce gusset folds in said sheet, and other folding means adapted to complete the folding of the sheet into pouch form.

49. In a pouch forming machine, a rotatable form carrier adapted to be intermittently indexed and including a mandrel form disposed in constant radial relation to the axis of the form carrier, means provided at one position of said form for feeding a sheet of material into relation with the end of said form, folding means adapted to partially fold said sheet about said form, and means provided at another position of said form for completing the folding of said sheet into pouch form.

50. In a pouch forming machine, a rotatable form carrier adapted to be intermittently indexed and including a mandrel form, means provided at one position of said form for feeding a sheet of material into relation with the end of said form, folding means adapted to partially fold said sheet about said form, holding means mounted on said carrier at each side of the form adapted to retain said folded portions during the indexing of the carrier, and means provided at another position of said form for completing the folding of said sheet into pouch form.

51. In a pouch forming machine, a rotatable form carrier adapted to be intermittently indexed and including a mandrel form disposed in constant radial relation to the axis of the form carrier, means provided at one position of said form for feeding a sheet of said material into relation with the end of said form, paste applying means for applying paste to the side edges of said sheet, folding means adapted to partially fold said sheet about said form and means provided at another position of said form for folding said pasted side edges to complete the folding of said sheet into pouch form.

52. In a pouch forming machine, a rotatable form carrier adapted to be intermittently indexed and including a mandrel form disposed in constant radial relation to the axis of the form carrier, means provided at one position of said form for feeding a length of material into relation with one side of said form, folding means for folding said length of material about said form into pouch form, means provided at another position of said form for feeding a sheet of material into relation with the end of said form containing said formed pouch, and folding means for folding said sheet about said form into pouch form to produce a lined pouch.

53. In a pouch forming machine, a rotatable form carrier adapted to be intermittently indexed and including a mandrel form disposed in constant radial relation to the axis of the form carrier, means provided at one position of said form for feeding a length of material into relation with one side of said form, folding means for folding said length of material about said form into pouch form, means provided at another position of said form for feeding a sheet of material into relation with the end of said form containing said formed pouch, paste applying means adapted to apply paste to said sheet, folding means for folding said sheet about said form into pouch form to produce a lined pouch, said paste on said sheet adapted to cause said sheet to adhere to the first formed pouch.

54. In a pouch forming machine, a rotatable form carrier adapted to be intermittently indexed and including a mandrel form disposed in constant radial relation to the axis of the form carrier, means provided at one position of said form for feeding a length of material into relation with one side of said form, folding means for folding said length of material about said form into pouch form, means provided at another position of said form for feeding a sheet of material into relation with the end of said form containing said formed pouch, paste applying means adapted to apply paste to said sheet, folding means for partially folding said sheet about said form whereby said sheet is attached to said formed pouch, and other folding means adapted to complete the folding of said sheet into pouch form to produce a lined pouch.

55. In a pouch forming machine, a rotatable form carrier adapted to be intermittently indexed and including a mandrel form disposed in constant radial relation to the axis of the form carrier, means provided at one position of said form for feeding a length of material into relation with one side of said form, folding means for folding said length of material about said form, means provided at another position of said form for feeding a sheet of material into relation with the end of said form containing said formed pouch, paste supplying means adapted to apply paste to the side edges of said sheet, folding means for partially folding said sheet about said form, and other folding means for folding the pasted edges of said sheet to complete the folding of the said material into pouch form to form a lined pouch.

56. In a pouch forming machine, a rotatable form carrier adapted to be intermittently indexed and including a mandrel form, means provided at one position of said form for feeding a sheet of material into relation with the end of said form, means for folding the ends of said material about said form, and folding means provided at another position of said form for completing the folding and comprising upper and lower side engaging members adapted to successively engage the sides of said form to fold in the sides of said sheet.

57. In a pouch forming machine, a rotatable form carrier adapted to be intermittently indexed and including a mandrel form, means provided at one position of said form for feeding a sheet of material into relation with the end of said form, means for folding the ends of said material about said form, and folding means provided at another position of said form for completing the folding and comprising upper and lower side engaging members adapted to successively engage the sides of said form to fold in the sides of said sheet, said member including movable side portions adapted to be moved toward and away from each other to closed and open position, and means adapted upon engagement with said form to move said members to closed position and upon disengagement to initially move said members to open position.

58. In a pouch forming machine, a rotatable form carrier adapted to be intermittently indexed and including a mandrel form disposed in constant radial relation to the axis of the form carrier, means provided at one position of said form, adapted to feed material into relation with said form, folding means adapted to fold material about said form into pouch form, and stripping means provided at another position of said form adapted to strip said pouch from the form.

59. In a pouch forming machine, a rotatable form carrier adapted to be intermittently indexed and including a mandrel form, means provided at one position of said form, adapted to feed material into relation with said form, folding means adapted to fold material about said form into pouch form, and stripping means provided at another position of said form adapted to strip said pouch from the form, said stripping means comprising a reciprocating member, arms carried by said member adapted to occupy opened and closed positions, and means adapted at the end of the forward movement of said member to close the arms about said member and at the end of the rearward movement to open said arms whereby said pouch is stripped from the form.

60. In a pouch forming machine, a rotatable form carrier adapted to be intermittently indexed and including a mandrel form, means provided at one position of said form adapted to feed material into relation with said form, folding means adapted to fold material about said form into pouch form, and stripping means provided at another position of said form adapted to strip said pouch from the form, said stripping means comprising a reciprocating member, arms carried by said member adapted to occupy opened and closed positions, and a relatively movable slide member carried by said reciprocating member and including a camming portion adapted at the end of the forward movement of said member to close said arms about the form and at the end of the rearward movement to open said arms whereby said pouch is stripped from the form.

61. In a pouch forming machine, a base, a superstructure mounted on said base and including mechanism supporting portions at each side, a rotatable form carrier mounted upon said superstructure upon a horizontal axis, means adapted to intermittently index said carrier, said carrier including a plurality of radially disposed mandrel forms adapted as the carrier is indexed to move successively between said supporting portion at one side, said base, and said supporting portion at the other side, and material feeding and folding means mounted on said supporting portions and said base adapted to feed material into relation with said forms and fold the same to form a lined pouch.

62. In a pouch forming machine, a base, a superstructure mounted on said base and including mechanism supporting portions at each side, a rotatable form carrier mounted upon said superstructure upon a horizontal axis, means adapted to intermittently index said carrier, said carrier including a plurality of radially disposed mandrel forms adapted as the carrier is indexed to move successively between said supporting portions, material feeding and folding means mounted on said supporting portion at one side for feeding material into relation with one of said forms and folding the same about said form into pouch form, and stripping means mounted on said supporting portion at the other side and adapted to remove the pouch from said form.

63. In a pouch forming machine, a base, a superstructure mounted on said base and including mechanism supporting portions at each side, a rotatable form carrier mounted upon said superstructure upon a horizontal axis, means adapted to intermittently index said carrier, said carrier including a plurality of radially disposed mandrel forms adapted as the carrier is indexed to move successively between said supporting portion at one side, said base, and said supporting portion at the other side, material feeding and folding means mounted on said supporting portion at one side adapted to feed material into relation with one of said forms and fold the same to form a pouch, material feeding and folding means mounted on said base adapted to feed material into relation with said form containing the pouch formed from said first material and fold the same to form a lined pouch, and stripping means mounted on said supporting portion at the other side adapted to remove the lined pouch from said form.

Signed at Bridgeport, in the county of Fairfield and State of Connecticut, this 13th day of October, A. D. 1924.

JOHN EDWARD FEFEL.